US012779264B2

(12) United States Patent
Cogswell

(10) Patent No.: US 12,779,264 B2
(45) Date of Patent: Nov. 3, 2026

(54) SYSTEMS AND METHODS FOR QUICK CONNECT STORAGE SPRINKLER

(71) Applicant: Tyco Fire Products LP, Cranston, RI (US)

(72) Inventor: Jeremy T. Cogswell, Johnston, RI (US)

(73) Assignee: Tyco Fire Products LP, Cranston, RI (US)

( * ) Notice: Subject to any disclaimer, the term of this patent is extended or adjusted under 35 U.S.C. 154(b) by 631 days.

(21) Appl. No.: 18/254,316

(22) PCT Filed: Feb. 14, 2022

(86) PCT No.: PCT/IB2022/051306
§ 371 (c)(1),
(2) Date: May 24, 2023

(87) PCT Pub. No.: WO2022/172249
PCT Pub. Date: Aug. 18, 2022

(65) Prior Publication Data
US 2024/0017108 A1 Jan. 18, 2024

Related U.S. Application Data

(60) Provisional application No. 63/149,396, filed on Feb. 15, 2021, provisional application No. 63/183,879, (Continued)

(51) Int. Cl.
*A62C 35/68* (2006.01)
*A62C 37/11* (2006.01)
*F16L 37/091* (2006.01)

(52) U.S. Cl.
CPC .............. *A62C 35/68* (2013.01); *A62C 37/11* (2013.01); *F16L 37/091* (2013.01)

(58) Field of Classification Search
CPC ......... A62C 35/68; A62C 37/11; A62C 37/12; A62C 37/14; A62C 37/16; F16L 37/091
See application file for complete search history.

(56) References Cited

U.S. PATENT DOCUMENTS 9,429,262 B2 * 8/2016 Ericksen ............. F16L 37/0915
9,447,906 B2 * 9/2016 Bobo .................... F16L 37/008
(Continued)

FOREIGN PATENT DOCUMENTS

KR 10-1110400 B1 2/2012
KR 10-2017-0026818 A 3/2017
(Continued)

OTHER PUBLICATIONS

Korean Intellectual Property Office as International Searching Authority; International Search Report and Written Opinion; PCT/IB2022/051306; dated May 24, 2022; 14 pages.

*Primary Examiner* — Darren W Gorman
(74) *Attorney, Agent, or Firm* — Foley & Lardner LLP

(57) ABSTRACT

A sprinkler system includes a sprinkler, a fitting, and a gasket. The sprinkler includes a body including a first portion and a second portion defining a thread, and a passageway extending from an inlet to an outlet, the inlet adjacent to the thread. The fitting includes an inner wall and a sidewall extending inward from the inner wall. The ring includes a ring body, a plurality of first engagement members extending outward from the ring body, and a plurality of second engagement members extending inward from the ring body. The ring is to be received between the inner wall, the sidewall, and the first portion.

16 Claims, 27 Drawing Sheets

Related U.S. Application Data filed on May 4, 2021, provisional application No. 63/239,497, filed on Sep. 1, 2021.

(56) References Cited

U.S. PATENT DOCUMENTS

| | | | |
|---|---|---|---|
| 9,604,404 B2* | 3/2017 | Ericksen | F16L 37/008 |
| 11,105,448 B1* | 8/2021 | Spears | F16L 21/08 |
| 2008/0303273 A1 | 12/2008 | Masarwa | |
| 2011/0214886 A1* | 9/2011 | Orr | A62C 35/68 285/321 |
| 2014/0232110 A1 | 8/2014 | Choi et al. | |
| 2015/0145248 A1* | 5/2015 | Hagen | F16L 37/0915 285/340 |
| 2019/0374802 A1 | 12/2019 | Coletta et al. | |
| 2020/0370687 A1* | 11/2020 | Taylor | F16L 37/101 |

FOREIGN PATENT DOCUMENTS

| | | |
|---|---|---|
| KR | 10-2019-0002256 A | 1/2019 |
| WO | WO-2008/008172 A2 | 1/2008 |
| WO | WO-2017/002739 A1 | 1/2017 |

* cited by examiner

SYSTEMS AND METHODS FOR QUICK CONNECT STORAGE SPRINKLER

CROSS-REFERENCE TO RELATED APPLICATIONS

The present application claims the benefit of and priority to U.S. Provisional Application No. 63/149,396, filed Feb. 15, 2021, U.S. Provisional Application No. 63/183,879, filed May 4, 2021, and U.S. Provisional Application No. 63/239,497, filed Sep. 1, 2021, the entire disclosures of which are each incorporated herein by reference in their entireties.

BACKGROUND

Sprinkler systems can be provided in buildings to address fire conditions. Sprinkler systems can include fire protection sprinklers that connect with piping systems to receive fluid to address the fire conditions.

SUMMARY

At least one aspect relates to a sprinkler system. The sprinkler system includes a sprinkler, a fitting, and a ring. The sprinkler includes a body including a first portion and a second portion defining a thread, and a passageway extending from an inlet to an outlet, the inlet adjacent to the thread. The fitting includes an inner wall and a sidewall extending inward from the inner wall. The ring includes a ring body, a plurality of first engagement members extending outward from the ring body, and a plurality of second engagement members extending inward from the ring body. The ring is to be received between the inner wall, the sidewall, and the first portion.

At least one aspect relates to a sprinkler adapter system. The sprinkler adapter system includes a fitting, a ring, and a gasket. The fitting includes an inner wall and a sidewall extending inward from the inner wall. The ring includes a ring body, a plurality of first engagement members extending outward from the ring body, and a plurality of second engagement members extending inward from the ring body. The gasket is to be received between the sidewall and the sprinkler.

At least one aspect relates to a method of installing a sprinkler. The method includes inserting an inlet end of the sprinkler into a fitting, a gasket is coupled with the sprinkler, the fitting defines an inner wall and an end wall extending from the inner wall that receives at least one flange of the sprinkler. The method includes rotating the sprinkler to engage a sprinkler engagement member of the sprinkler with a fitting engagement member of the fitting, the fitting engagement member defined by the inner wall, to seal the sprinkler with the fitting using the gasket.

At least one aspect is directed to a fitting assembly to connect to a pipe. The fitting assembly can include a body. The body can include a first end, a second end, an outer wall, or a plurality of inner walls. The body can include a passageway. The passageway can extend from the first end to the second end and laterally between the plurality of inner walls. The body can include a plurality of sidewalls. The plurality of sidewalls can protrude from one or more portions of the plurality of inner walls towards the passageway. The first end can receive a portion of the pipe. The second end can receive a portion of a sprinkler. The fitting assembly can include a ring. The ring can have a ring body. The ring can have a plurality of engagement members that extend from the ring body. The plurality of engagement members can extend from the ring body towards the passageway. The fitting assembly can include a gasket.

At least one aspect is directed to a method of installing a pipe into a fitting assembly. The method can include receiving a portion of the pipe via a first end of a body of the fitting assembly. The method can include receiving a portion of a sprinkler via a second end of the body. The body can include a first end, a second end, an outer wall, or a plurality of inner walls. The body can include a passageway. The passageway can extend from the first end to the second end and laterally between the plurality of inner walls. The body can include a plurality of sidewalls. The plurality of sidewalls can protrude from one or more portions of the plurality of inner walls towards the passageway. The method can include engaging one or more portions of the portion of the pipe received by the first end with a plurality of engagement members of a ring. The plurality of engagement members can extend from a ring body of the ring and towards the passageway.

At least one aspect is directed to a method of installing a pipe into a fitting assembly. The method can include providing a fitting assembly. The fitting assembly can include a body. The body can include a first end, a second end, an outer wall, or a plurality of inner walls. The body can include a passageway. The passageway can extend from the first end to the second end and laterally between the plurality of inner walls. The body can include a plurality of sidewalls. The plurality of sidewalls can protrude from one or more portions of the plurality of inner walls towards the passageway. The first end can receive a portion of the pipe. The second end can receive a portion of a sprinkler. The fitting assembly can include a ring. The ring can have a ring body. The ring can have a plurality of engagement members that extend from the ring body. The plurality of engagement members can extend from the ring body towards the passageway. The fitting assembly can include a gasket.

At least one aspect relates to a sprinkler system. The sprinkler system includes a sprinkler, a fitting, and a gasket. The sprinkler includes a body having an inlet end and an opening, at least one flange extending radially outward from the body and positioned between the inlet end and the opening, and a sprinkler engagement member positioned between the at least one flange and the inlet end. The fitting includes an inner wall having a fitting engagement member that couples with the sprinkler engagement member, an inner wall edge extending radially outward from the inner wall, and an end wall extending from the inner wall edge to an outer edge. The gasket is received between the at least one flange, the end wall, and the inner wall edge to seal the sprinkler with the fitting.

At least one aspect relates to a gasket of a sprinkler system. The gasket includes a wall having an inner surface and an outer surface. An insert portion of the wall has a lesser thickness than a remainder of the wall, the insert portion defined from the inner surface.

At least one aspect relates to a piping assembly. The piping assembly can include a first fitting, a second fitting, and a gasket. The first fitting can include a body having an inlet end and an opening, at least one flange extending radially outward from the body and positioned between the inlet end and the opening, and a first engagement member positioned between the at least one flange and the inlet end. The second fitting can include an inner wall having a second engagement member that couples with the first engagement member, an inner wall edge extending radially outward from the inner wall, and an end wall extending from the inner wall edge to an outer edge. The gasket can be on the at least one flange, and sized to be positioned between the at least one flange, the inner wall edge, and the end wall.

At least one aspect relates to a sprinkler. The sprinkler can include a body, at least one flange, an engagement member, at least one frame arm, a deflector, a seal, a thermal activation element, and a gasket. The at least one flange can extend radially outward from the body and positioned between the inlet end and the opening. The engagement member can be positioned between the at least one flange and the inlet end. The at least one frame arm can extend from the body. The deflector can be attached to the at least one frame arm. The seal can be positioned in an opening of the body fluidly coupled with the inlet end. The thermal activation element can be in contact with the seal and change state responsive to a fire condition to allow the seal to be moved out of the opening by fluid flowing through the body. The gasket can be positioned on the at least one flange.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
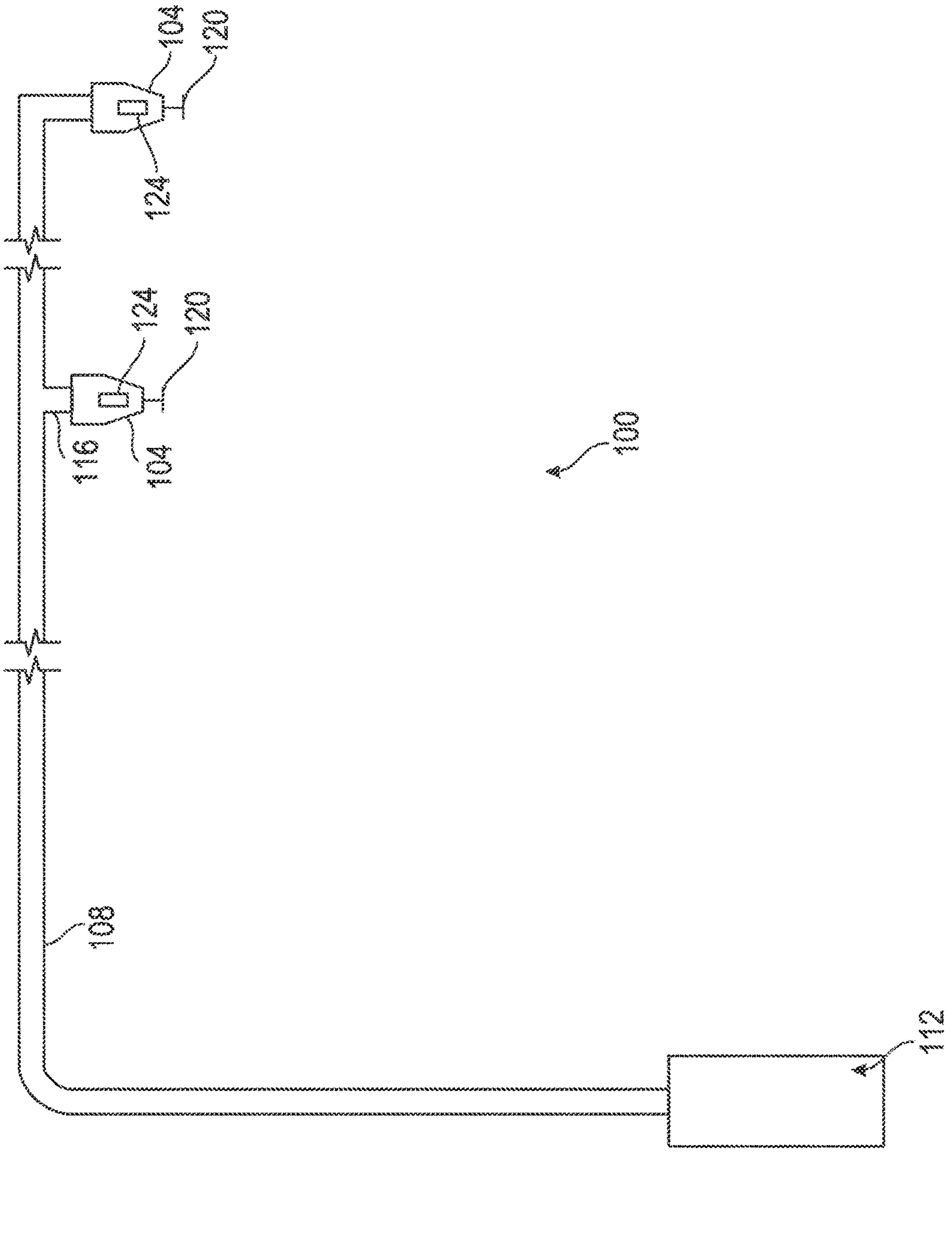
FIG. 1 depicts an example of a sprinkler system.

The present disclosure generally relates to fire sprinkler systems. More particularly, the present disclosure relates to a fire sprinkler that can be installed with greater speed, such as by reducing or avoiding the need to use adhesives or pipe tape to properly seal the sprinkler to piping, or otherwise enabling tool-free installation. Fire sprinkler systems include sprinklers that can inhibit or permit flow of fluid (water or other fire suppressant fluid).

In the instance of a fire or detected conditions that may be indicative of a fire (e.g., increased heat, smoke, etc.), the sprinklers can permit the flow of fluid such that the fluid may contact a deflector and be dispersed so as to address the fire. The sprinklers may disperse water or fire protection fluid over a specific area, for example a storage commodity, a portion of a room or hallway, or a window or wall. In order to accomplish fire exposure protection for a given area (e.g., room, hallway, window, wall, etc.), fire sprinklers couple with a piping system that directs fire suppressant from a source to the fire sprinklers. The fire sprinklers can selectively couple with the piping during installation of the fire suppression system. For example, fire sprinklers include threading that can interface with threading on the piping system to fluidly seal the fire sprinklers to the piping system. It can be difficult to properly install fire sprinklers such that the fire sprinklers are properly sealed.

Sprinkler systems in accordance with the present disclosure can include a sprinkler (or other fitting, such as a pipe, tee joint, elbow joint, cross joint, or pipe outlet, including threaded or grooved outlets or couplings) that includes a flange to stop insertion of the sprinkler into a fitting (e.g., adapter coupled with a pipe or the pipe itself) that receives the sprinkler, and a gasket that can be positioned between the sprinkler and fitting, and a ring (e.g., o-ring) that facilitates hand tightened connection and proper sealing of the sprinkler and fitting. For example, a sprinkler system can include includes a sprinkler, a fitting, and a ring. The sprinkler includes a body including a first portion and a second portion defining a thread, and a passageway extending from an inlet to an outlet, the inlet adjacent to the thread. The fitting includes an inner wall and a sidewall extending inward from the inner wall. The ring includes a ring body, a plurality of first engagement members extending outward from the ring body, and a plurality of second engagement members extending inward from the ring body. The ring is to be received between the inner wall, the sidewall, and the first portion. The gasket can include dimples to provide an interference fit and a relief cut to decrease insertion forces.

The sprinkler can include at least one of a flange and a shoulder that abuts the fitting to prevent overtightening to prevent deformation of the gasket. The system can implement particular sizes or ratios of features such as thread pitch, gasket height, and flange height to facilitate installation of the sprinkler. Various such features can enable a more rapid installation of the sprinkler while enabling proper sealing and preventing overtorqueing.

The sprinkler can be coupled with a fitting assembly, which can include a protruding ring to assist in preventing movement of a pipe within the fitting assembly, as well as a body and a gasket. The body can receive a portion of the pipe through a first end and receive a portion of the sprinkler through a second end. A passageway can extend generally between the first end and second end and radially about a longitudinal axis that extends from the first end to the second end and through a point of the pipe and a point of the sprinkler (e.g., midpoint). The body can include several sidewalls that extend from a portion of several inner walls to form a plurality of seats. A gasket can be positioned on one of the seats, for instance. When the portion of the pipe is received by the first end of the body, the protruding ring can flex to interface or engage with the pipe to maintain the pipe in place. Furthermore, the gasket can seal off a portion of the passageway to create a water-tight seal, for example.

For example, the sprinkler system can include a sprinkler, a fitting, and a gasket. The sprinkler can include a body having an inlet end and an opening. The sprinkler can be an early suppression fast response (ESFR) sprinkler. The sprinkler can include at least one flange extending radially outward from the body and positioned between the inlet end and the opening. The at least one flange can be sized to receive the gasket between the at least one flange and the fitting, and to abut an outer edge of the fitting to prevent overtightening or overcompression of the gasket. The sprinkler can include a sprinkler engagement member, such as a straight thread, positioned between the at least one flange and the inlet end. The fitting can include an inner wall having a fitting engagement member that couples with the sprinkler engagement member, an inner wall edge extending radially outward from the inner wall, and an end wall extending from the inner wall edge to the outer edge. The fitting can be made from a weldable material. The gasket can be received between the at least one flange, the end wall, and the inner wall edge to seal the sprinkler with the fitting. The gasket can be made from a material having a Shore hardness less than or equal to 80 durometers. The gasket can be made from a material having a Shore hardness greater than or equal to 50 and less than or equal to 60 durometers.

The sprinkler and various other components of the system can be used for storage applications, including but not limited to use for ceiling-only systems, and for ceiling heights up to and over fifty five feet. For example, the system can be used for storage commodities such as Class I, II, III or IV, Group A, Group B, or Group C plastics, elastomers, or rubber commodities, or any combination thereof. The storage commodity can be in an arrangement such as a single-row rack arrangement, a double-row rack arrangement, a multi-row rack arrangement, a palletized arrangement, a solid-piled arrangement, a bin box arrangement, a shelf arrangement, a back-to-back shelf arrangement, an on floor arrangement, and a rack without solid shelves arrangement, or any combination thereof. The system can be used in accordance with various standards, such as standards set forth by the National Fire Protection Association (NFPA) or FM Global.

FIG. 1 depicts a fire suppression system 100. The fire suppression system 100 can be a chemical fire suppression system. The fire suppression system 100 can distribute a fire suppressant agent onto or nearby a fire, extinguishing the fire and preventing the fire from spreading. The fire suppression system 100 can be used alone or in combination with other types of fire suppression systems (e.g., a building sprinkler system, a handheld fire extinguisher). Multiple fire suppression systems 100 can be used in combination with one another to cover a larger area (e.g., each in different rooms of a building).

The fire suppression system 100 can be used in a variety of applications. The fire suppression system 100 can be used with a variety of fire suppressant agents, including but not limited to water (e.g., may use powders, liquids, foams, or other fluid or flowable materials). The fire suppression system 100 can be used for storage applications, including ceiling-only, in-rack, or a combination of ceiling and rack sprinklers, such as to be installed for storage commodities such as Class I, II, III or IV, Group A, Group B, or Group C plastics, elastomers, or rubber commodities, or any combination thereof. The storage commodity can be in an arrangement such as a single-row rack arrangement, a double-row rack arrangement, a multi-row rack arrangement, a palletized arrangement, a solid-piled arrangement, a bin box arrangement, a shelf arrangement, a back-to-back shelf arrangement, an on floor arrangement, and a rack without solid shelves arrangement, or any combination thereof.

The fire suppression system 100 can include or be coupled with a fluid supply 112. The fluid supply 112 can define an internal volume filled (e.g., partially filled, completely filled) with fire suppressant agent. The fluid supply 112 can provide fluid from a remote or local location to a building in which the fire suppression system 100 is located. The fluid supply may include, for example, a municipal water supply, pump, piping system, tank, cylinder, or any other source of water or fire suppression agent.

Piping 108 (e.g., one or more pipes, tubes, conduits) can be fluidly coupled with one or more sprinklers 104. The piping 108 can include vertical pipes 116. The vertical pipes 116 can extend perpendicular from the piping 108. The sprinklers 104 can receive water or other fire suppressant agent from the fluid supply 112 via the piping 108 and the vertical pipes 116.

The sprinklers 104 can each define one or more outlets, through which the fire suppressant agent exits and contacts a deflector 120, such as to form a spray of water or other fire suppressant agent that covers a desired area. The sprays from the sprinklers 104 then suppress or extinguish fire within that area. The deflectors 120 of the sprinklers 104 can be shaped to control the spray pattern of the fire suppressant agent leaving the sprinklers 104. The sprinklers 104 can be used as concealed sprinklers, pendent sprinklers, upright sprinklers, water mist nozzles, or any other device for spraying fire suppression agent.

The sprinklers 104 can include an activation element (e.g., thermal element) 124. The activation element 124 can change from a first state that prevents fluid flow out of the sprinkler 104 to a second state that permits fluid flow of the sprinkler 104 responsive to a fire condition. For example, the activation element 124 can include a glass bulb including a fluid that expands responsive to an increase in temperature (e.g., responsive to heat provided to the fluid from a fire), such as to cause the glass bulb to break responsive to the temperature meeting or exceeding a threshold temperature; the activation element 124 can include a fusible link that includes two or more pieces coupled using a solder than can melt responsive to the temperature meeting or exceeding a threshold temperature; the activation element 124 can include an electric actuator (e.g., an electrically triggered pyrotechnic actuator or electrically actuated bulb or link). The activation element 124 can have a response time index (RTI) less than or equal to 80 $(m/s)^{1/2}$, or less than or equal to 50 $(m/s)^{1/2}$.

The sprinklers 104 can be early suppression, fast response (ESFR) sprinklers. The sprinklers 104 can have K-factors greater than or equal to 14.0 $GPM/PSI^2$ and less than or equal to 36.0 $GPM/PSI^2$. The sprinklers 104 can be arranged (e.g., in a grid or tree arrangement over a storage commodity) to have sprinkler to sprinkler spacings greater than or equal to eight feet by eight feet and less than or equal to twelve feet by twelve feet. The sprinklers can be rapid install sprinklers (RIS). The rapid install sprinklers are configured to be connected with a pipe in quick time. To achieve this, the pitch of engageable threads provided on these sprinklers is altered from the standard national pipe threads (NPT). Due to the alteration in the pitch of the engageable threads, the sprinklers can be installed in quick time and with less torque requirement as compared to other sprinklers having national pipe threads (NPT). Due to the different pitch of the engageable threads, the rapid install sprinklers may not be directly connected with a pipe or connectors having standard national pipe threads (NPT). The present disclosure discloses fittings elaborated in following paragraphs to facilitate connection between standard threads of pipe or connector with non-standard threads of the sprinklers or standard threads of other sprinklers with non-standard threads of pipe or connector which are specifically provided to be connected with rapid install sprinklers. The sprinklers can be rapid install early suppression, fast response (RI ESFR) sprinklers provided with non-standard (for example, non-NPT) engageable threads.

Figure 2A:
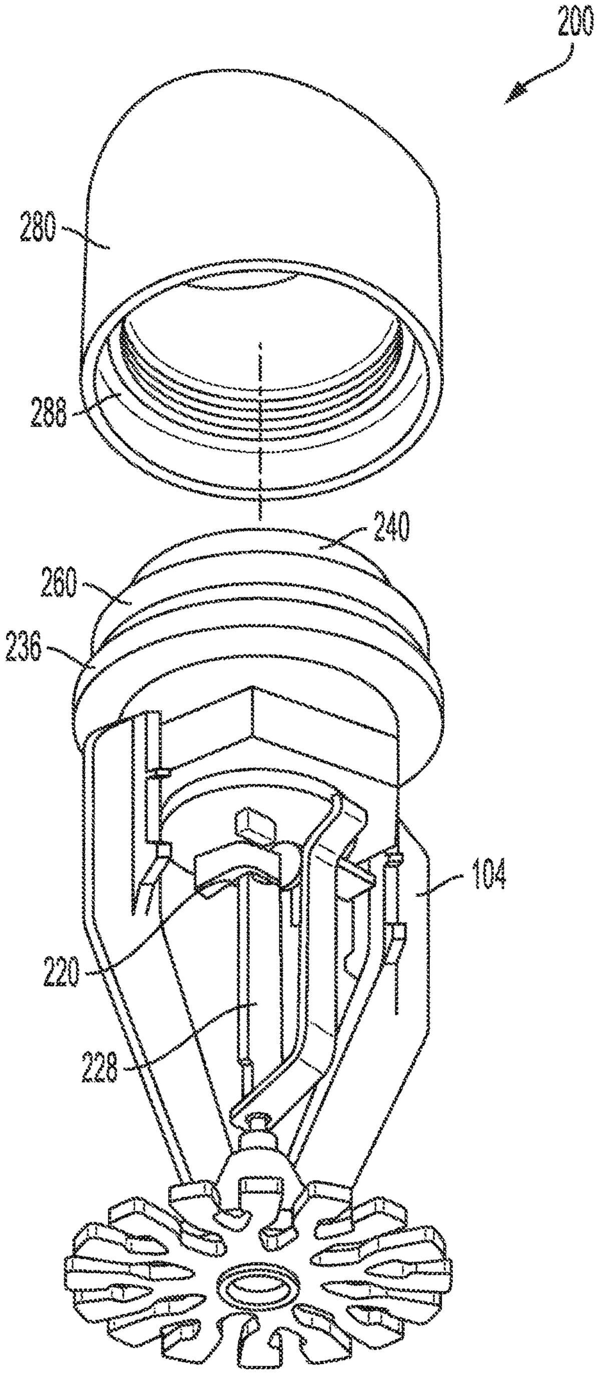
FIGS. 2A and 2B depict an example of a sprinkler system that includes a ring and a gasket.
Figure 2B:
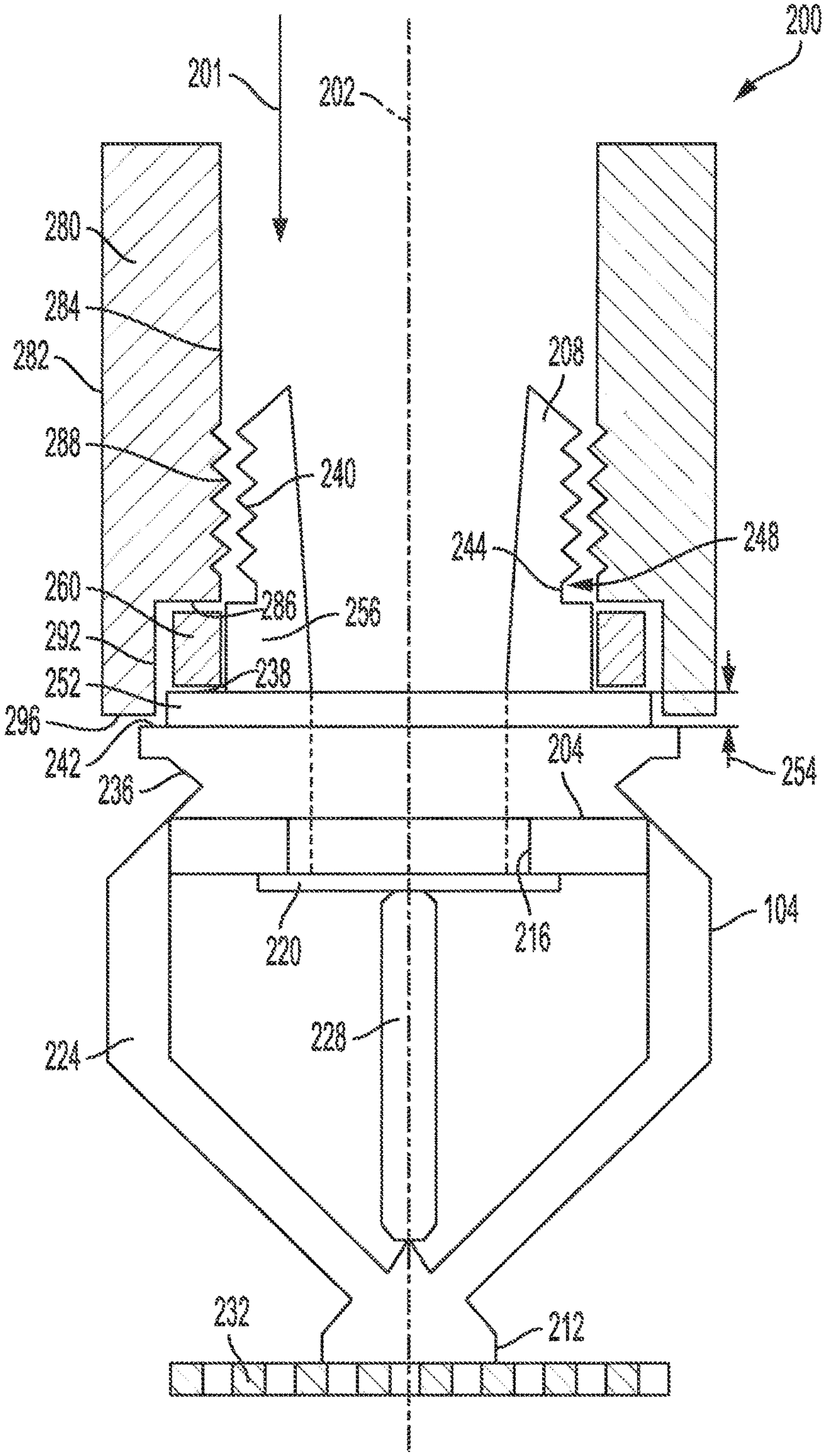

FIGS. 2A and 2B depict a sprinkler system 200. The sprinkler system 200 can incorporate features and components of the fire suppression system 100 described with reference to FIG. 1. The sprinkler system 200 can be used for fire protection in various applications, including but not limited to storage applications. The sprinkler system 200 can be rapidly assembled to properly install and seal the sprinkler 104, and may not require pipe tape (or may otherwise allow for a tool-free installation) to complete the seal.

The sprinkler 104 can be coupled with a fitting 280 to receive fluid flow in a direction 201 form the fitting 280. The fitting 280 can be an adapter (including but not limited to a welded or strap-on pipe outlet, tee fitting, or elbow fitting) to couple the sprinkler 104 with a pipe, or can form an outlet portion of the pipe (e.g., at least one of pipe 108 and pipe 116 described with reference to FIG. 1). At least one of the sprinkler 104 and the fitting 280 can be made from a metal (e.g., steel, brass, iron), or a polymeric material (e.g., plastic, CPVC). For example, the fitting 280 can be made of a weldable metal, such as steel, brass, or iron. The fitting 280 can be at least one machined and molded as a unitary structure. The sprinkler 104 can be an example of a body that can be provided with gasket 260 to couple with the fitting 280, such as a body that includes the at least one flange 236 (e.g., flanges 236 and 252) and the gasket receiver 256, to be connected with the fitting 280 by hand (e.g., without using tools). The gasket 260 can have various form factors, including but not limited to being a round or square gasket, as well as incorporating cutouts, dimples, or other features to facilitate effective sealing and coupling between the sprinkler 104 and fitting 280.

The fitting 280 can be welded to the piping 108 of FIG. 1. For example, the fitting 280 and piping 108 can be made of steel to be welded together. As described herein, the gasket 260 can be provided on the sprinkler 104, rather than in the fitting 280, so that the welding operation does not deform the gasket 260. In various examples, the gasket 260 can be arranged relative to at least one of the sprinkler 104 and the fitting 280 to form a radial seal (e.g., compression applied to the inner and outer diameters of the gasket 260) or a face seal (e.g., compression applied to a top and bottom of the cross section of the gasket 260).

The sprinkler 104 includes a body 204 that can extend from an inlet end 208 to an outlet end 212. The body 204 can define an opening 216 through which fluid can flow from the fitting 280. The sprinkler 104 can include a seal 220, such as a button that can be positioned in the opening 216 to seal the opening 216.

The sprinkler 104 can include at least one frame arm 224 that extends from the body 204. The frame arms 224 can extend to the outlet end 212. The frame arms 224 can be radially outward relative to the opening 216 (e.g., relative to longitudinal axis 202 extending through the opening 216).

The sprinkler 104 can include an activation element 228 positioned between the seal 220 and the outlet end 212. The activation element 228 can incorporate features of the activation element 124 described with reference to FIG. 1. For example, the activation element 228 can include a glass bulb within which a fluid can expand to break the glass bulb responsive to temperature meeting or exceeding a threshold temperature, or a fusible link that can break responsive to the temperature meeting or exceeding the threshold temperature. The activation element 228 can apply a force on the seal to secure the seal 220 in the opening 216. Responsive to the activation element 228 breaking, the seal 220 can move out of the opening 216 (e.g., by pressure of fluid in the body 204 applied against the seal 220), allowing fluid from the fitting 280 to flow through the opening 216.

The sprinkler 104 can include a deflector 232. The deflector 232 can receive fluid from the fitting 280 through the opening 216 (e.g., responsive to the seal 220 moving out of the opening 216) and output the received fluid according to a target spray pattern. For example, the deflector 232 can include one or more tines shaped to cause the fluid to be outputted according to the target spray pattern. The deflector 232 can extend from the frame arms 224 (or a portion of the sprinkler 104 between the frame arms 224 and the deflector 232). The target spray pattern can correspond to an orientation of the deflector 232 (e.g., relative to longitudinal axis 202).

The sprinkler 104 can include at least one flange 236 between the inlet end 208 and the opening 216. The at least one flange 236 can define at least one support surface 238 that can contact the gasket 260 responsive to securing the sprinkler 104 with the fitting 280. The at least one flange 236 can form at least part of a neck portion of the sprinkler 104 that can be in contact with or received by the fitting 280.

The sprinkler 104 can include at least one engagement member 240 that can engage with the fitting 280. For example, as depicted in FIG. 2B, the at least one engagement member 240 can include threading that extends around the inlet end 208. The engagement member 240 can include straight thread, which can facilitate connection of the sprinkler 104 with the fitting 208.

The engagement member 240 can extend from the inlet end 208 along a first portion of the sprinkler 104 to a gap portion 244 that defines a gap 248 between the engagement member 240 and the at least one flange 236. The gap portion 244 can be radially inward from outer edges of the engagement member 240 and from the at least one flange 236 (e.g., from the second flange 252) relative to a longitudinal axis 202.

The fitting 280 can include an inner wall 284 that defines at least one fitting engagement member 288. The fitting engagement member 288 can couple with (e.g., threadably engage with) the engagement member 240 of the sprinkler 104 to secure the fitting 280 with the sprinkler 104. The fitting engagement member 288 can be straight thread. At least a portion of the fitting 280 can define the fitting engagement member 288. Responsive to engaging the sprinkler 104 with the fitting 280 (e.g., threading the sprinkler 104 into the fitting 280), the at least one flange 236 can apply pressure on the gasket 260 to seal the sprinkler 104 with the fitting 280, such as to compress the gasket 260 between the sprinkler 104 and the fitting 280.

The fitting 280 can include an end wall 292 radially outward from the inner wall 284 (as depicted in FIG. 2B, an outer surface of 282 the fitting 280 opposite the inner wall 284 and end wall 292 can be continuous, having the same outer radius). The inner wall 284 can define an inner wall edge 286 (e.g., shelf) between the inner wall 284 and the end wall 292. The inner wall edge 286 can be opposite the at least one support surface 238 of the at least one flange 236 while the sprinkler 104 is received by the fitting 280. The end wall 292 and the at least one flange 236 of the sprinkler 104 can receive the gasket 260 so that the gasket 260 seals the sprinkler 104 and the fitting 280. For example, the gasket 260 can be received between the inner wall edge 286 and the end wall 292 of the fitting 280 and the support surface 238 and gasket receiver 256 of the sprinkler 104, such that engagement of the sprinkler 104 and the fitting 280 (e.g., using engagement members 240, 280) compresses the gasket 260 between the inner wall edge 286 and the support surface 238. As discussed below, an outer edge 296 of the end wall 292 can contact the at least one flange 236 of the sprinkler 104, enabling the at least one flange 236 to stop further movement of the sprinkler 104 into the fitting 280 (e.g., in a direction along longitudinal axis 202), such as to prevent overtightening of the sprinkler 104 with the fitting 280 and prevent overcompression of the gasket 260. The fitting 280 and sprinkler 104 can position the gasket 260 so that the gasket 260 is not in a flow path through the fitting 280 and the body 204.

The at least one flange 236 can include a first flange 236, a second flange 252, and a gasket receiver 256. The first flange 236 can extend further radially outward (e.g., has a greater outer diameter than) than the second flange 252 so that a support surface 242 of the first flange 236 contacts the outer edge 296 of the fitting 280. The second flange 252 can extend further radially outward than (e.g., has a greater outer diameter than) the gasket receiver 256, and can contact the gasket 260 (e.g., a sprinkler 104-facing portion of the gasket 260). The gasket receiver 256 can contact the gasket 260, allowing the gasket 260 to be retained on the gasket receiver 256 during installation as shown in FIG. 2A.

Figure 3:
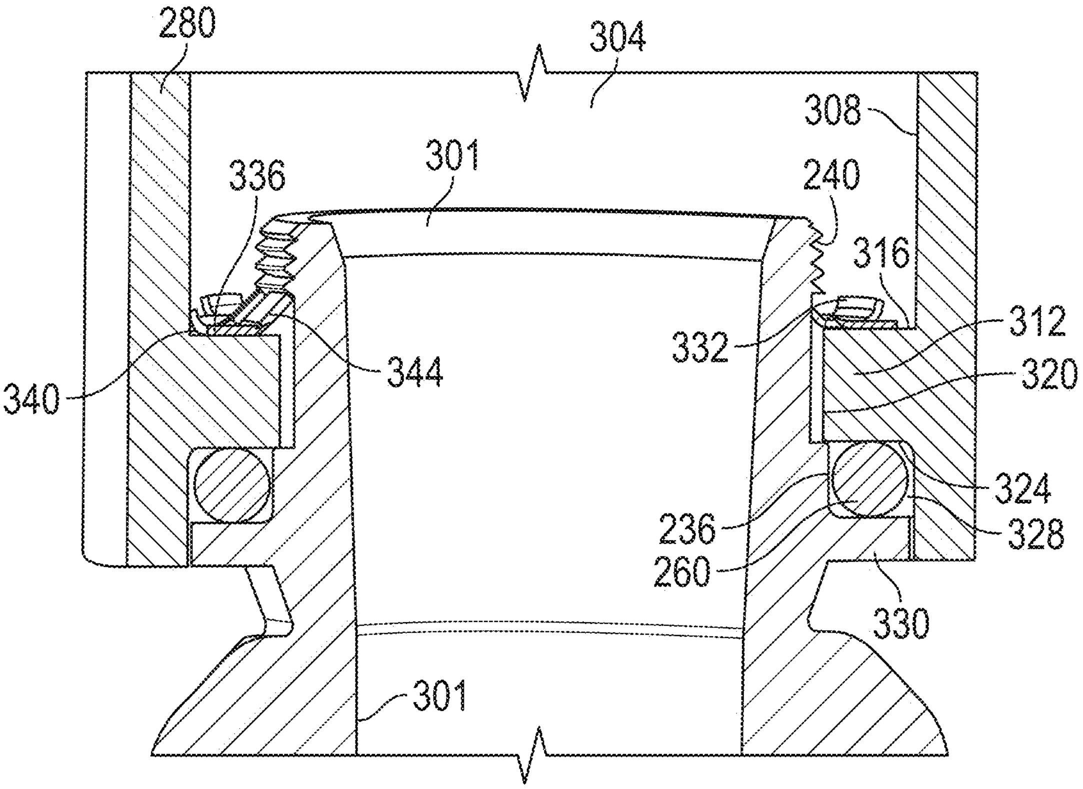
FIG. 3 depicts an example of a detail view of a sprinkler system that includes a ring and a gasket.
Figure 4:
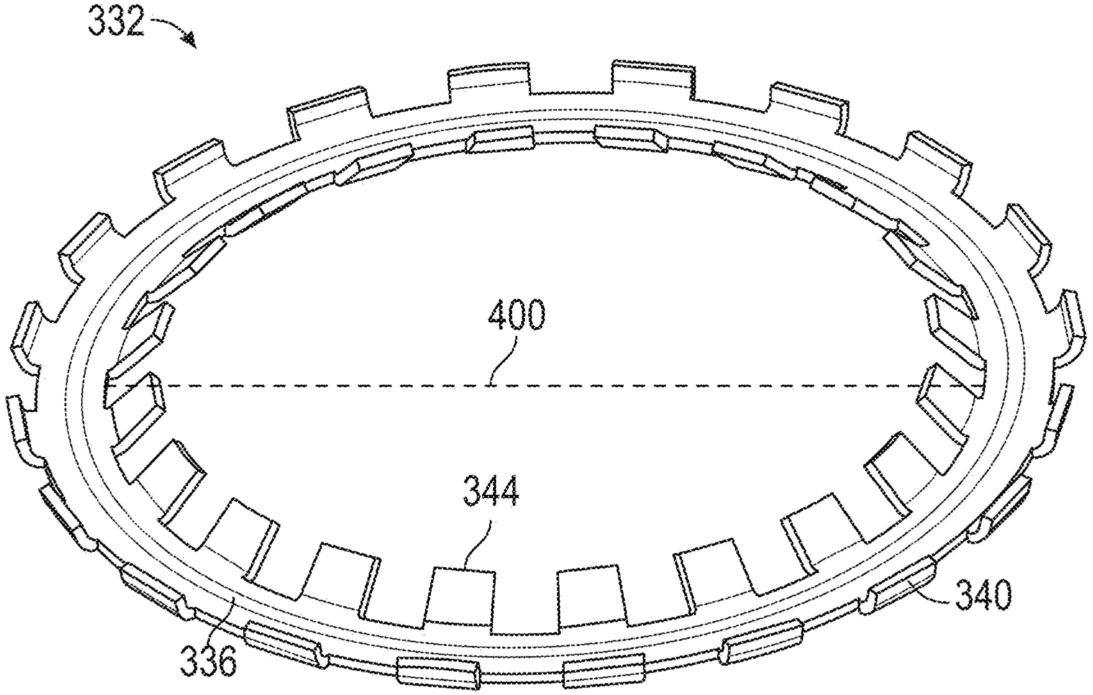
FIG. 4 depicts an example of a ring of a sprinkler system.

FIGS. 3 and 4 depict an example of a ring 332 that can be coupled with at least one of the sprinkler 104 and the fitting 280. The fitting 280 can define a channel 304 through which fluid can be provided to the sprinkler 104 (e.g., into passageway 301 of the sprinkler 104). The inner wall 284 of the fitting 280 can define the channel 304, such that the channel 304 extends along the inner wall 284.

The fitting 280 can include a sidewall 312 extending from the inner wall 284. For example, the sidewall 312 can extend inward from the inner wall 284. The sidewall 312 can include a first surface 316, a second surface 320 extending from the first surface 316, and a third surface 324 extending from the second surface 320 and opposite the first surface 316. A length of the second surface 320 can be less than a distance from the engagement member 240 to the at least one flange 236 to allow connection of the sprinkler 104 with the fitting 280 in the manner described herein.

The third surface 324 and a portion of the inner wall 308 adjacent to the third surface 324 and the end wall 292 can define a space 328 in which the gasket 260 can be received between the fitting 280 and the sprinkler 104. An inner diameter of the inner wall 308 adjacent to the space can be within a threshold of an outer diameter of a shoulder 330 (e.g., shoulder 330 formed by flange 236) of the sprinkler 104 to facilitate sealing around the gasket 260. The shoulder 330 can limit movement of the sprinkler 104 into the fitting 280 by contact with the fitting 280.

The fitting 280 can receive a ring 332. The ring 332 can be an o-ring. The ring 332 can include a ring body 336, a plurality of first engagement members 340 extending outward from the ring body 336, and a plurality of second engagement members 344 extending inward from the ring body 336, such that the ring 332 can be a double grip ring. The ring body 336 can define a diameter 400 less than an inner diameter of the inner wall 284 and greater than an outer diameter of the sprinkler 104 to be positioned between the sprinkler 104, the sidewall 312, and the inner wall 308.

The plurality of first engagement members 340 can contact and engage the inner wall 308. This can facilitate resisting movement of the ring 332 relative to the fitting 280. The plurality of first engagement members 340 can extend at an angle from the ring body 336, such as at an angle out of a plane in which the diameter 400 lies and which intersects the ring body 336 and the plurality of first engagement members 340. At least a subset of the plurality of first engagement members 340 can have a same height (e.g., in a direction in the plane of FIG. 3).

As depicted in FIG. 3, the fitting 280 can include a groove. The groove can be adjacent to the first surface 316 of the sidewall 312, or spaced along the inner wall 284 from the first surface 316. The groove can receive the plurality of first engagement members 340 to restrict movement of the ring 332 in a direction opposite direction 201, such as when the sprinkler 104 is being at least one of pushed into the fitting 280 and rotated relative to the fitting 280, to facilitate coupling between the sprinkler 104, fitting 280, and ring 332.

The plurality of first engagement members 340 can be shaped to match (e.g., engage with) the engagement member 240. As such, installation can be performed by inserting the sprinkler 104 into the fitting 280 and rotating the sprinkler 104 relative to the plurality of first engagement members 340. The sprinkler 104 can be rotated to orient the deflector 232 in a target orientation, while coupling the sprinkler 104 with the fitting 280 using the plurality of engagement members 340 and sealing the sprinkler 104 with the fitting 280 using the gasket 260. The ring 332 can define a width that is less than greater than a length of the first surface 316 to enable engagement between the ring 332, the sprinkler 104, and the inner wall 308.

The plurality of second engagement members 344 can be helical. For example, a size (e.g., at least one of a length and a height) of the second engagement members 344 can vary in a helical arrangement sequentially around the ring 332. The size can correspond to a size (e.g., thread spacing or pitch) of the engagement member 240 of the sprinkler 104. By implementing the second engagement members 344 using a helical form factor, the sprinkler 104 can be more easily removed by hand from the fitting 280, and overtorqueing of the sprinkler 104 with respect to the fitting 280 during installation can be mitigated or avoided, as the sprinkler 104 may drop back down to a lower level of coupling between thread of engagement member 240 and the second engagement members 344 (including, for example, while the first engagement members 340 are received in groove). The size of the second engagement members 344 can also be based on a size of the gasket 260 so that the gasket 260 can properly form a seal between the fitting 280 and sprinkler 104 (e.g., without overcompression). For example, the size of the second engagement members 344 can be within a range based on at least one of a size of the engagement member 240 and a surface area or cross-sectional area of the gasket 260 to achieve coupling and sealing (e.g., tool-free installation) of the sprinkler 104 with the fitting 280 while mitigating or preventing overtorqueing of the sprinkler 104 or overcompression of the gasket 260.

To facilitate installing the sprinkler 104 with the ring 332 and fitting 280, at least one of the groove and first engagement members 340 can be made to restrict relative rotation of the sprinkler 104 with the fitting 280. For example, the groove can include one or more pockets formed by a relatively greater depth of the groove in the one or more pockets, such that one or more first engagement members 340 can be received further into the one or more pockets to stop rotation of the ring 332 (e.g., up to a threshold amount of force, or in a particular direction).

Figure 10:
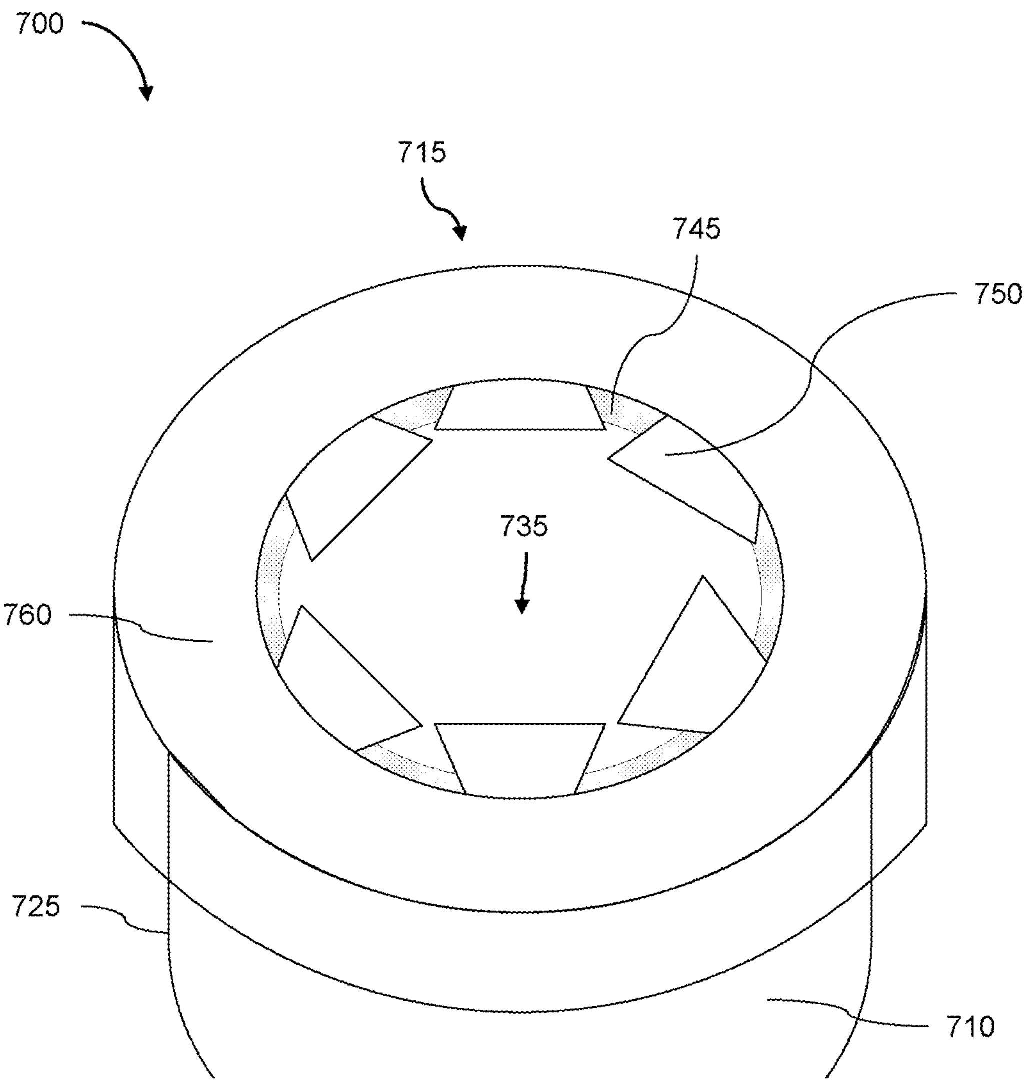
FIG. 10 is a perspective view of an example of a portion of a fitting assembly.

One or both lateral edges 404, 408 of the first engagement members 340 can have sharp corners (e.g., an angle of transition from edges 404, 408 to end wall 412 can be greater than a threshold angle) to restrict rotation of the ring 332 relative to the inner wall 284 of the fitting 280 (e.g., relative to groove). For example, the engagement members 340 can be shaped in a manner analogous to engagement members 750 described with reference to FIG. 10. Including relatively sharper corners on one of the lateral edges 404 relative to the other of the lateral edges 408 can facilitate restricted rotation in a first direction of rotation (e.g., for installation), while allowing less restriction in the opposite direction (e.g., for removal).

Figure 5:
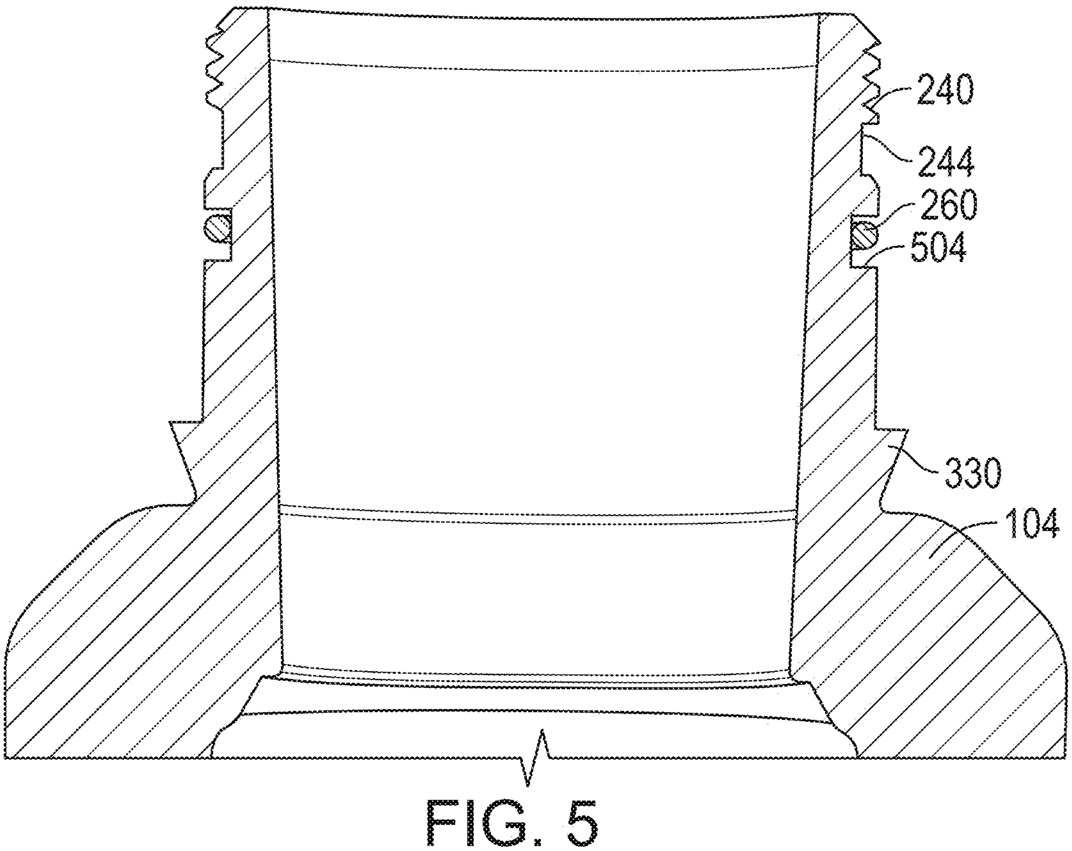
FIG. 5 depicts an example of a sprinkler.

FIG. 5 depicts an example of the sprinkler 104 in which the sprinkler 104 includes a groove 504. The groove 504 can be between the engagement member 240 and the shoulder 330 along an outer surface of the sprinkler 104. The groove 504 can receive the gasket 260, such as to position the gasket between the groove 504 and the tapered sidewall of the fitting 600 described with respect to FIG. 6. In various examples, the gasket 260 can be arranged relative to at least one of the sprinkler 104 and the fitting 600 to form a radial seal (e.g., compression applied to the inner and outer diameters of the gasket 260) or a face seal (e.g., compression applied to a top and bottom of the cross section of the gasket 260).

Figure 6:
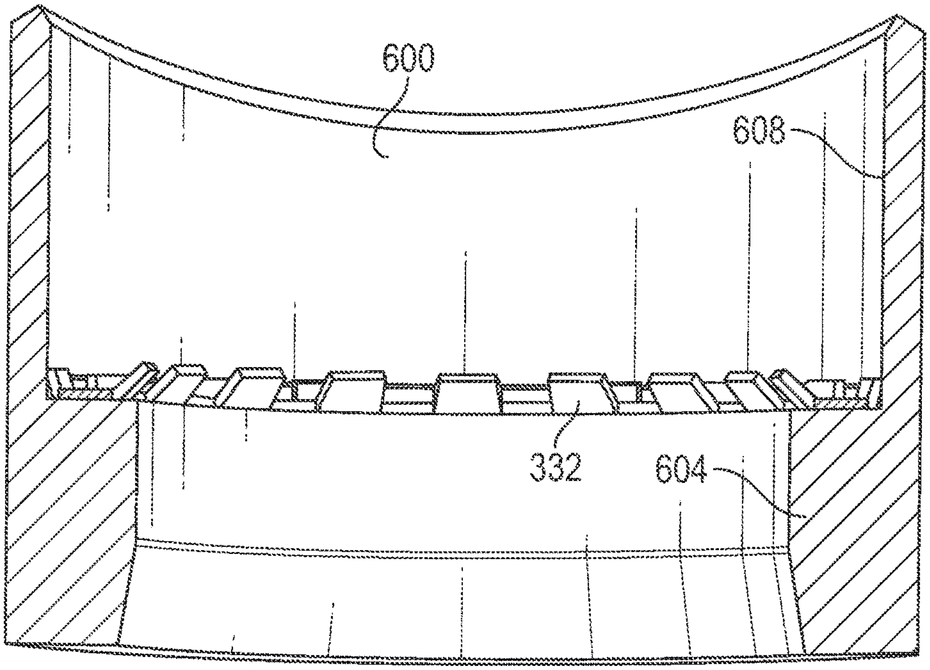
FIG. 6 depicts an example of a ring and a fitting.

FIG. 6 depicts an example of a fitting 600 to couple with the sprinkler 104 as depicted in FIG. 5. The fitting 600 can incorporate features of the fitting 280 described with respect to FIGS. 2-4. The fitting 600 can include a tapered sidewall 604 (e.g., tapering by expanding in a direction towards where the sprinkler 104 is received), radially inward from an inner wall 608, into which the sprinkler 104 can be received. The ring 332 can contact the sidewall 604 and inner wall 608 and couple with the sprinkler 104. The sidewall 604 can receive the gasket 260 between the gasket 260 and the groove 504 of the sprinkler 104 as described with reference to FIG. 5. The tapering of the sidewall 604 can allow for pressure release between the sprinkler 104 and the fitting 600 while the sprinkler 104 is still in contact with the fitting 600 (e.g., during sprinkler removal).

Figure 7:
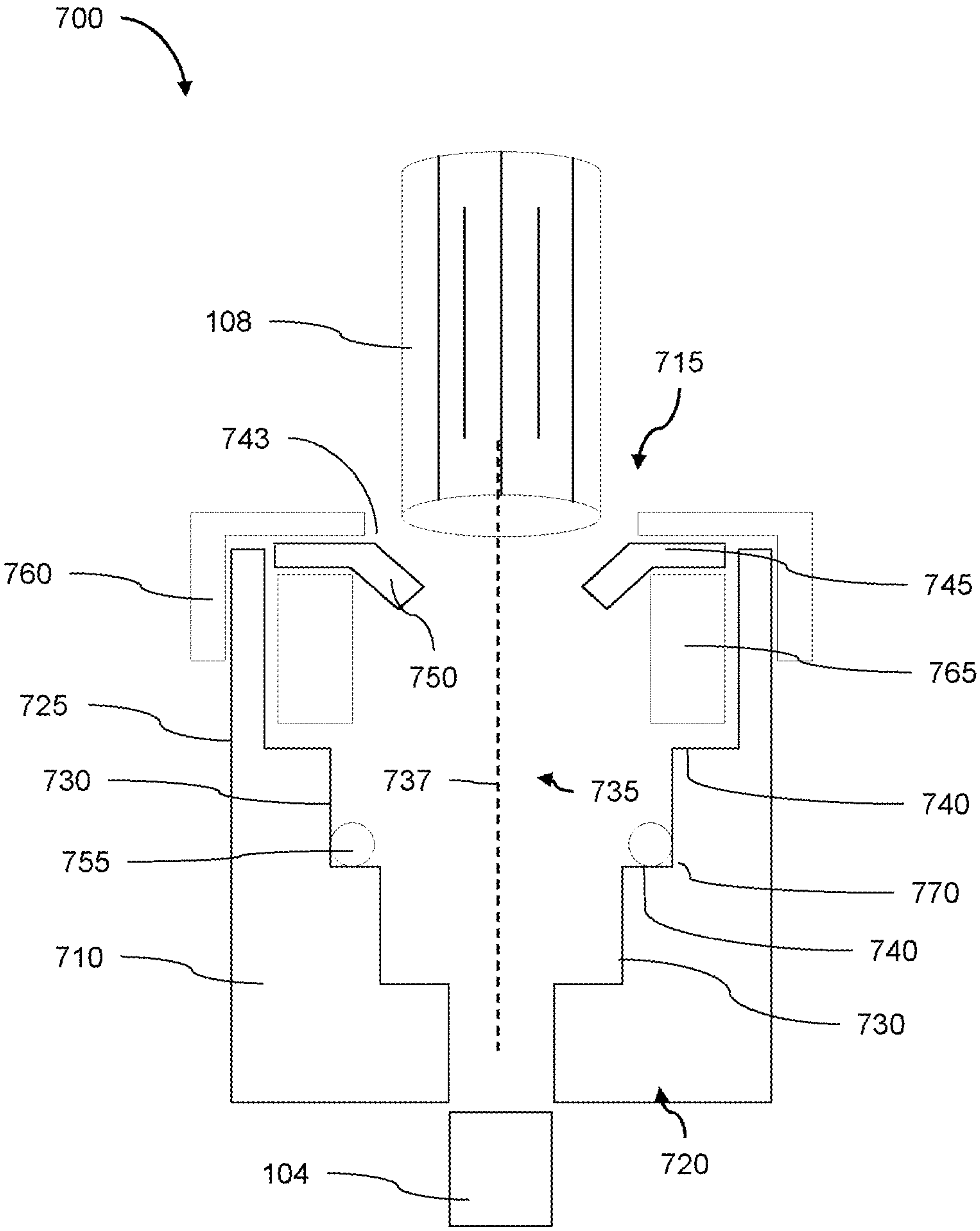
FIG. 7 is a cross-sectional view of an example of a portion of a fitting assembly.

FIGS. 7-11 depict an example of a fitting assembly 700. The fitting assembly 700 can incorporate features of various systems and devices described herein, including the fire suppression system 100, sprinkler system 200, and fitting 600. The fitting assembly 700 can connect the pipe 108 with the sprinkler 104, such as to enable a push connection for CPVC fittings and piping. As depicted in FIG. 7, the pipe 108 can include striations 702, which can be positioned in various arrangements on the pipe 108 to facilitate engagement with various components described herein.

The fitting assembly 700 can include a body 710. The body 710 can be a variety of shapes for connecting the pipe 108 with the sprinkler 104. For example, the body 710 can be a tubular structure similar to a pipe or conduit. The body 710 can include a first end 715 and a second end 720 that opposes the first end 715. The body 710 can include an outer wall 725. The body 710 can include a plurality of inner walls 730, as depicted in FIG. 7. For example, the body 710 can include an inner wall towards the second end 720. The body 710 can include an inner wall towards a middle section of the body 710, as another example. The body 710 can include an inner wall towards the first end 715, as yet another example. The body 710 can include various amounts of inner walls. For example, the plurality of inner walls 730 can include two inner walls. The plurality of inner walls 730 can include three inner walls. The plurality of inner walls 730 can include more than three inner walls. The body 710 can include a passageway 735 that extends between the first end 715 and the second end 720. The passageway 735 can extend laterally between the plurality of inner walls 730. For example, the passageway 735 can extend radially about a longitudinal axis 737 that extends from the first end 715 to the second end 720.

The body 710 can include a plurality of sidewalls 740, as depicted in FIG. 1. For example, the body 710 can include a sidewall towards the second end 720. The body 710 can include a sidewall towards a middle section of the body 710, as another example. The body 710 can include a sidewall towards the first end 715, as yet another example. The body 710 can include various amounts of sidewalls. For example, the plurality of sidewalls 740 can include two sidewalls. The plurality of sidewalls 740 can include three sidewalls. The plurality of sidewalls 740 can include more than three sidewalls.

The plurality of sidewalls 740 can protrude from at least one portion of the plurality of inner walls 730, as shown FIG. 1. For example, a sidewall of the plurality of sidewalls 740 can protrude from one portion of an inner wall of the plurality of inner walls 730. A sidewall of the plurality of sidewalls 740 can protrude from two portions of one or more inner walls of the plurality of inner walls 730, as another example. The plurality of sidewalls 740 can protrude towards the passageway 735. For example, a sidewall of the plurality of sidewalls 740 can protrude towards the longitudinal axis 737. A sidewall of the plurality of sidewalls 740 can protrude at an angle towards the passageway 735 relative to the longitudinal axis 737, as another example.

The first end 715 of the body 710 can receive a portion of the pipe 108. For example, the pipe 108 can be coupled with the body 710. At least one of the pipe 108 and the body 710 can be made from a polymeric material (e.g., plastic, CPVC). The pipe 108 can be coupled with the body 710 such that the pipe 108 may not rotate or be removed from the body 710, as an example.

The second end of the body 710 can receive a portion of the sprinkler 104. For example, the body 710 can be an adapter (including but not limited to a tee fitting or an elbow fitting) to couple the pipe 108 with the sprinkler 104. The body 710 can be made from a polymeric material (e.g., plastic, CPVC).

The fitting assembly 700 can include at least one ring 743. For example, the ring 743 can be made of metallic material. The ring 743 can be made of non-metallic material, as another example. The ring 743 can include a ring body 745. The ring body 745 can define a diameter less than an inner diameter extending laterally between at least one of the plurality of inner walls 730 such that the ring body 745 can be positioned on at least one of the plurality of sidewalls 740 and in between at least one of the plurality of inner walls 730. The ring 743 can include a plurality of engagement members 750. For example, the plurality of engagement members 750 can extend from the ring body 745. The plurality of engagement members 750 can extend from multiple portions of the ring 743, in other examples.

The plurality of engagement members 750 can extend from the ring body 745 towards to passageway 735. For example, the plurality of engagement members 750 can extend from the ring body 745 at an angle towards the second end 720 of the body 710. The plurality of engagement members 750 can extend at an angle relative to the longitudinal axis 737, as another example.

The fitting assembly 700 can include a gasket 755. For example, the gasket 755 can be a ring, as depicted FIG. 1. The gasket 755 can be an O-ring, for example. The gasket 755 can be received between the body 710 and the pipe 108, for example. The gasket 755 can be received between the body 710 and the sprinkler 104. The gasket 755 can be received by at least one sidewall of the plurality of sidewalls 740.

Figure 11:
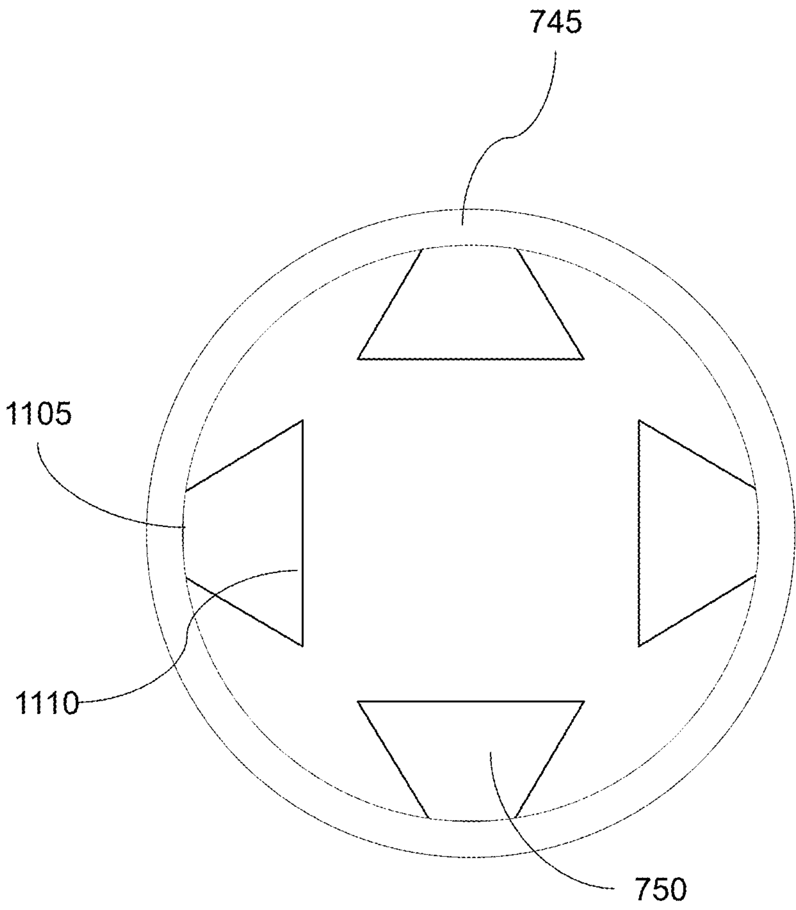
FIG. 11 is a top view of an example of a ring of a fitting assembly of FIG. 1.

The plurality of engagement members 750 can include a first end portion 1105 and a second end portion 1110, as depicted FIG. 11. The plurality of engagement members 750 can extend from the first end portion 1105 to the second end portion 1110, as an example. The first end portion 1105 can be coupled with the ring body 745. For example, the first end portion 1105 can extend from an edge section of the ring body 745. The second end portion 1110 can be larger than the first end portion 1105. For example, the first end portion 1105 and the second end portion 1110 can include a width running substantially parallel with the ring body 745, as depicted in FIG. 11. A width of the first end portion 1105 can be generally smaller in dimension than a width of the second end portion 1110.

The plurality of engagement members 750 can engage with at least one portion of a portion of the pipe 108 received by the first end 715 of the body 710. For example, the second end portion 1110 of at least one of the plurality of engagement members 750 can make contact with a surface of the pipe 108 when a portion of the pipe 108 is received by the first end 715 of the body 710.

The plurality of engagement members 750 can be made from a flexible or resilient material. The plurality of engagement members 750 can flex upon engagement of at least one portion of a portion of the pipe 108 received by the first end 715 of the body 710. For example, the plurality of engagement members 750 can flex downwards toward the second end 720 of the body 710 when the pipe 108 is received by the first end 715 of the body 710. The plurality of engagement members 750 can flex to be substantially parallel with the longitudinal axis 737, as another example. The plurality of engagement members 750 can flex such that the plurality of engagement members 750 extend substantially parallel with the pipe 108 to maintain the pipe 108 in place within the body 710.

The plurality of engagement members 750 can protrude into the passageway 735 at an angle such that the plurality of engagement members 750 protrude towards the second end 720 of the body 710. For example, the plurality of engagement members 750 can protrude to extend directly perpendicular with reference to the longitudinal axis 737. The plurality of engagement members 750 can protrude at an angle to be directly parallel with the longitudinal axis 737. The plurality of engagement members 750 can protrude at an angle such that the plurality of engagement members 750 are neither parallel nor perpendicular with the longitudinal axis 737, as depicted in FIG. 7.

The plurality of engagement members 750 can be various shapes. For examples, the plurality of engagement members 750 can have a generally trapezoidal shape, as depicted in FIG. 11. The plurality of engagement members 750 can have a generally square shape, as another example. The plurality of engagement members 750 can have a generally rounded shape. The plurality of engagement members 750 can have a convex rounded shape, with at least two end points, as another example. The plurality of engagement members 750 can be any shape to engage with a portion of the pipe 108 received by the first end 715 of the body 710. For example, the engagement members 750 can have sharp edges to prevent the body 710 from rotating with respect to the pipe 108.

Figure 8:
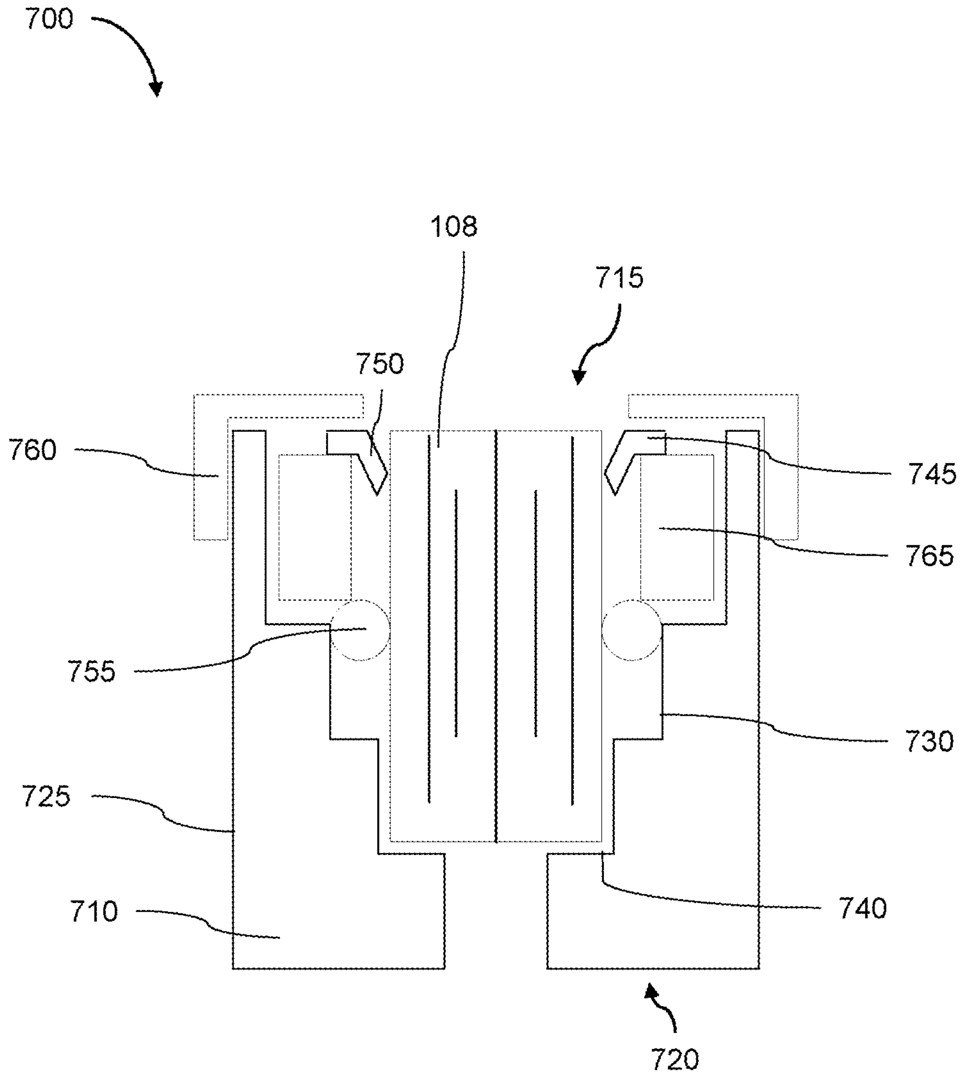
FIG. 8 is cross-sectional view of an example of a portion of a fitting assembly.

The fitting assembly 700 can include at least one spacing component 765 (e.g., spacer). For example, the fitting assembly 700 can include one spacing component 765. The fitting assembly 700 can include two spacing components 165. The fitting assembly 700 can include more than two spacing components 165. The spacing component 765 can have a rectangular shape, as depicted in FIG. 7. The spacing component 765 can have various other shapes according to other examples. The spacing component 765 can be received by at least one of the plurality of sidewalls 740. The spacing component 765 can be received by at least one of the plurality of inner walls 730. The spacing component 765 can support the ring body 745, as depicted in FIGS. 7 and 8. The spacing component 765 can support the ring body 745 while the plurality of engagement members 750 flex to engage with the pipe 108, as an example.

Figure 9:
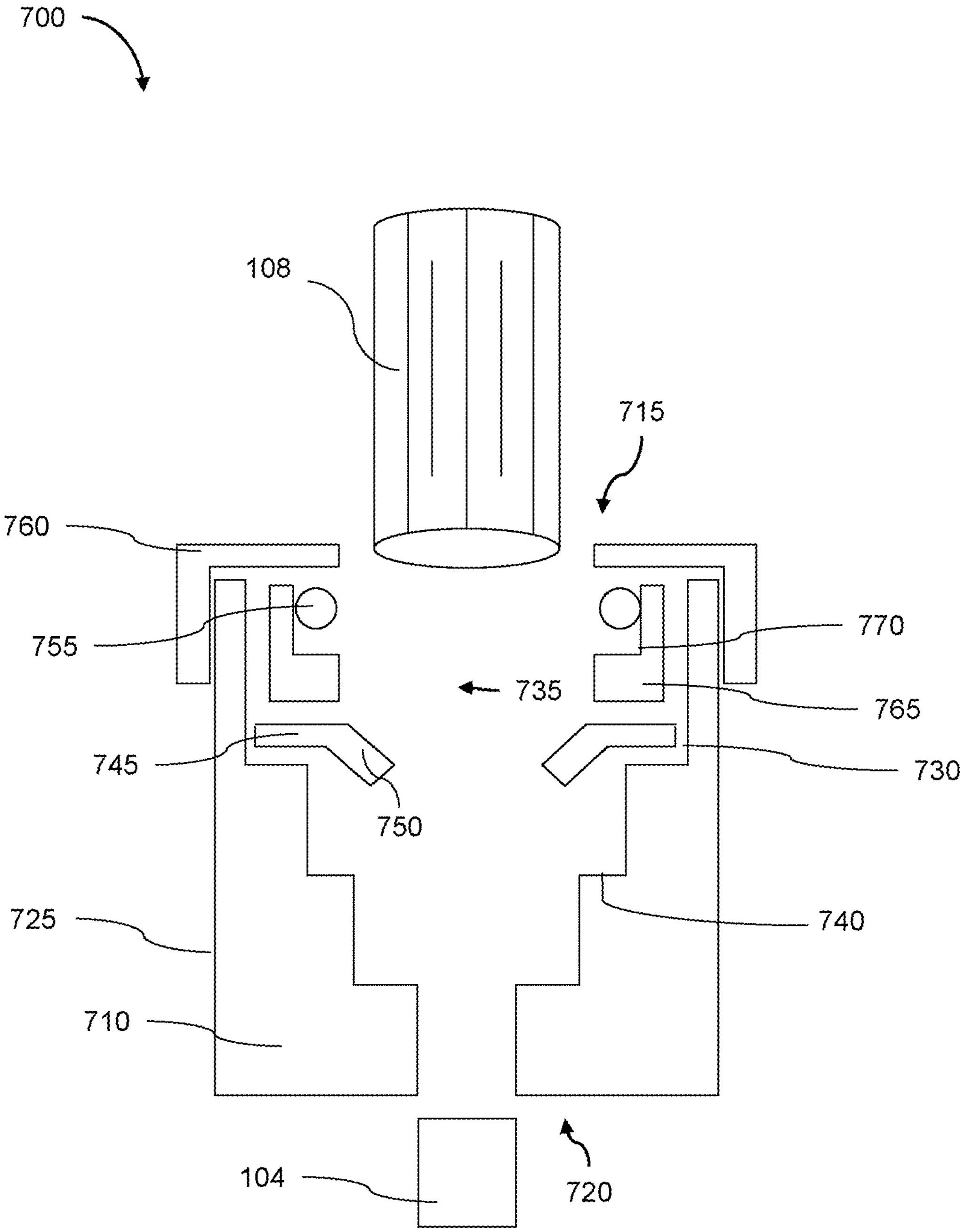
FIG. 9 is cross-sectional view of an example of a portion of a fitting assembly.

The spacing component 765 can support the gasket 755, as depicted in FIG. 9. The spacing component 765 can be shaped to include a portion to receive the gasket 755, for example. The spacing component 765 can maintain the ring 743 in position within the body 710 in various ways. For example, the spacing component 765 can be disposed below the ring 743, as depicted in FIGS. 7 and 8. The spacing component 765 can be disposed on top of the ring 743, as depicted in FIG. 9. The spacing component 765 can maintain the ring 743 in position in various other ways. Another component of the fitting assembly 700 can assist in maintaining the ring 743 in place.

The fitting assembly 700 can include a groove 770 to receive the gasket 755. For example, the groove 770 can be defined by an inner wall of the plurality of inner walls 730 and a sidewall of the plurality of sidewalls 740, as depicted in FIG. 7. The groove 770 can be defined by at least one portion of the spacing component 765 according to other examples, as depicted in FIG. 9. The fitting assembly 700 can include a groove 770 defined by various components of the body 710 to receive the gasket 755.

The gasket 755 can be positioned to prevent liquid from moving through the passageway 735 in-between the pipe 108 and the sprinkler 104. For example, when the pipe 108 is received by the first end 715 of the body 710, the gasket 755 can be positioned to seal off the fitting assembly 700 in various ways. For example, the gasket 755 can be moved upwards or downwards opposite the movement of the pipe 108 being received by the first end 715 of the body 710. When the pipe 108 is coupled with the body 710, the gasket 755 can prevent movement of fluid within the passageway 735 and outside of the pipe 108 to create a water-tight seal within the fitting assembly 700.

The fitting assembly 700 can include a cap 760. The cap 760 can be coupled with the fitting assembly 700 in various ways. For example, the cap 760 can be coupled with the fitting assembly by welding or adhesives. The cap 760 can be coupled with the fitting assembly 700 by fasteners, as another example. The cap 760 can be coupled with the fitting assembly 700 using snap-fit components.

The cap 760 can be coupled with the first end 715 of the body 710, as depicted FIGS. 7-10. For example, the cap 760 can be coupled with the ring body 745, the first end 715 of the body 710, and the outer wall 725 of the body 710, as depicted FIG. 7. The cap 760 can be coupled with the first end 715 and the outer wall 725 of the body 710 through various ways. For example, the cap 760 can be coupled with the first end 715 and the outer wall 725 of the body 710 through welding, or other similar adhesives. The cap 760 can be coupled with the first end 715 and the outer wall 725 of the body 710 through fasteners, such as screws, as another example. The cap 760 can be coupled with the first end 715 and the outer wall 725 of the body 710 through various other ways including, but not limited to, ultra-sonic welding, injection molding, or snap-fit components.

The ring body 745 of the ring 743 can maintain position within the fitting assembly 700 with a turning force applied. For example, the ring body 745 will not rotate relative to the body 710 of the fitting assembly 700 with the pipe 108 installed. The cap 760 can assist in maintaining the ring body 745 in position. For example, the cap 760 can be coupled with the fitting assembly 700 and the ring body 745 such that the ring body 745 cannot rotate relative to the fitting assembly 700. The cap 760 can be coupled with the fitting assembly such that the pressure between the cap 760 and the fitting assembly 700 maintains the ring body 745 in position, as another example. The cap 760 can assist in maintaining the ring body 745 in position such that the ring body 745 cannot rotate relative to the body 710 in various ways.

The spacing component 765 can assist in maintaining the ring body 745 in position. For example, the spacing component 765 can cause a force or pressure on the ring body 745 within the fitting assembly 700 such that the ring body 745 may not move under a turning force. Various components of the fitting assembly 700 can assist in preventing the ring body 745 from rotating with a turning force applied. At least one of the cap 760 and spacing component 765 can be ultrasonically welded with one or more components of the fitting assembly 700, or coupled by interference fit to facilitate manufacturing.

Figure 12:
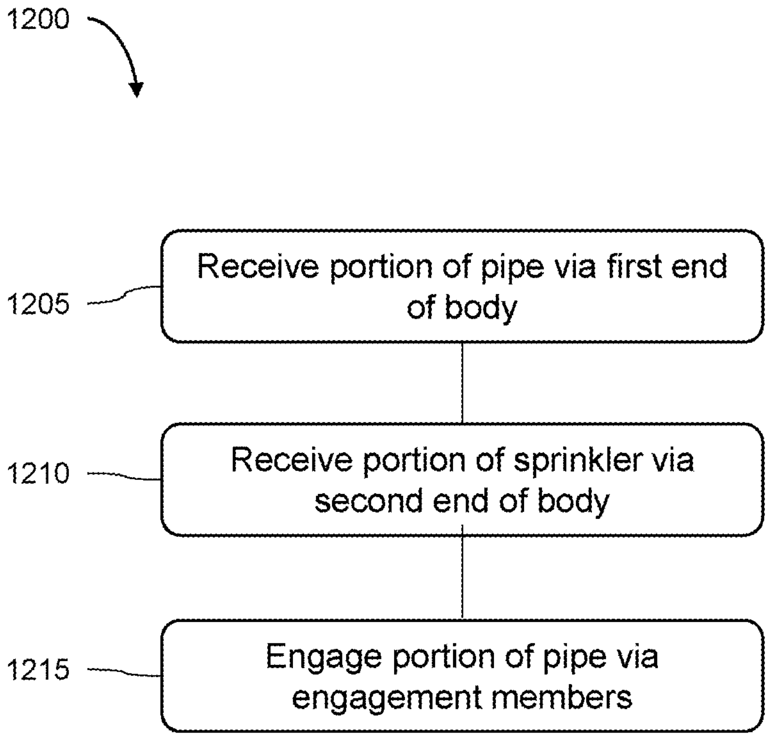
FIG. 12 depicts a flow diagram of an example of a method of installing a pipe into a fitting assembly.

FIG. 12 depicts a method 1200 of installing a pipe 108 into a fitting assembly 700. The method 1200 can include receiving a portion of the pipe 108 via a first end 715 of a body 710 of the fitting assembly 700, as depicted in act 1205. For example, the pipe 108 can be coupled with the body 710. The body 710 can include an outer wall 725, a plurality of inner walls 730, and a plurality of sidewalls 740. A passageway 735 can extend between the first end 715 and a second end of the body 710. The plurality of sidewalls 740 can protrude from at least one portion of the plurality of inner walls 730. For example, the plurality of sidewalls 740 can extend from the plurality of inner walls 730 to create at least one seat. At least one of the pipe 108 and the body 710 can be made from a polymeric material (e.g., plastic, CPVC). The pipe 108 can be coupled with the body 710 such that the pipe 108 may not rotate or be removed from the body 710, as an example.

The method 1200 can include receiving a portion of a sprinkler 104 via the second end 720 of the body 710, as depicted in act 1210. For example, the body 710 can be an adapter, including but not limited to, a tee fitting or elbow fitting, to couple the pipe 108 with the sprinkler 104. At least one of the pipe 108, the sprinkler 104, and the body 710 can be made from a polymeric material (e.g., plastic, CPVC).

The method 1200 can include engaging a portion of the pipe 108 via engagement members 750, as depicted in act 1215. For example, a plurality of engagement members 750 of a ring 743 can engage with at least one portion of the pipe 108 received by the first end 715 of the body 710. For example, a second end portion 1110 of at least one of the plurality of engagement members 750 can make contact with a surface of the pipe 108 when a portion of the pipe 108 is received by the first end 715 of the body 710. The plurality of engagement members 750 can flex upon engagement of at least one portion of a portion of the pipe 108 received by the first end 715 of the body 710. For example, the plurality of engagement members 750 can flex downwards toward the second end 720 of the body 710 when the pipe 108 is received by the first end 715 of the body 710. The plurality of engagement members 750 can flex to be substantially parallel with the longitudinal axis 737, as another example. The plurality of engagement members 750 can flex such that the plurality of engagement members 750 extend substantially parallel with the pipe 108 to maintain the pipe 108 in place within the body 710.

The method 1200 can include sealing the portion of the pipe 108 with the body 710 such that no fluid can flow between the pipe 108 and the passageway 735. For example, a gasket 755 can be used to create a water-tight seal between the pipe 108 and the sprinkler 104 within the body 710 such that no fluid leaks into the passageway 735.

The method 1200 can include flexing the plurality of engagement members 750 with engagement of the pipe 108. For example, the plurality of engagement members 750 can flex towards the second end 720 of the body 710 to support the pipe 108 within the body 710.

The method 1200 can include protruding the plurality of engagement members 750 into the passageway 735 at an angle towards the second end 720 of the body 710. For example, the plurality of engagement members 750 can extend from the ring body 745 into the passageway 735 at an angle relative to the longitudinal axis 737.

Figure 13:
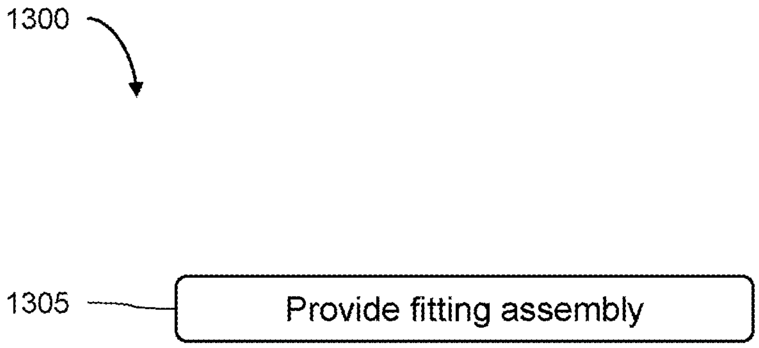
FIG. 13 depicts a flow diagram of an example of a method of installing a pipe into a fitting assembly.

FIG. 13 depicts a method 1300 of installing a pipe 108 into a fitting assembly 700. The method 1300 can include providing the fitting assembly 700, as depicted in act 1305. The fitting assembly 700 can include a body 710. The body 710 can include a first end 715 and an opposing second end 720. The body 710 can include a plurality of inner walls 730. The body 710 can include a plurality of sidewalls 740. The body 710 can include a passageway 735 extending from the first end 715 to the second end 720 and between the plurality of inner walls 730. The first end 715 can receive a portion of the pipe 108. The second end 720 can receive a portion of a sprinkler 104. The fitting assembly 700 can include a ring 743. The ring can include a ring body 745 and a plurality of engagement members 750. The plurality of engagement members 750 can engage the pipe 108. The plurality of engagement members 750 can have a first end portion 1105 and a second end portion 1110. The first end portion 1105 can couple with the ring body 745. The second end portion 1110 can extend from the first end portion 1105 such that the second end portion 1110 is larger than the first end portion 1105. The fitting assembly 700 can include a gasket 755.

Figure 14:
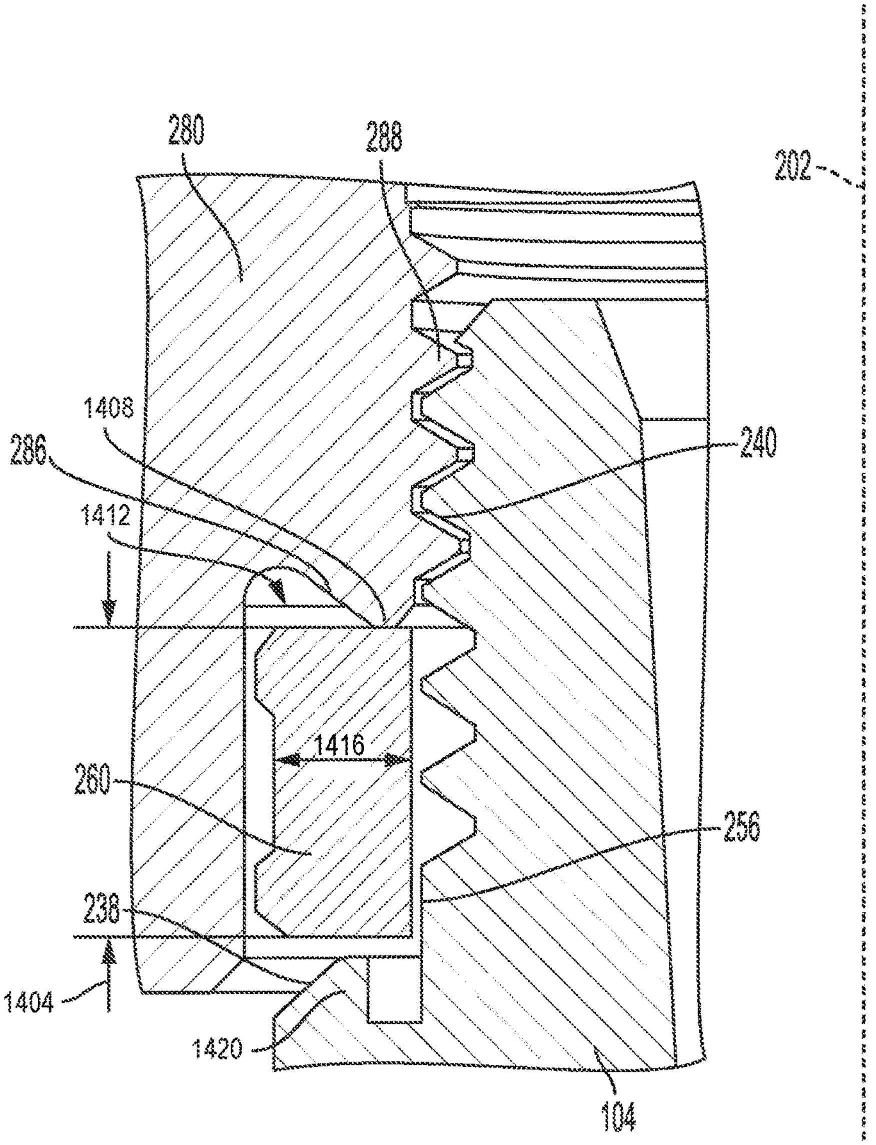
FIG. 14 depicts a detail view of an example of a sprinkler, fitting, and gasket of a sprinkler system.

FIG. 14 depicts the sprinkler 104 coupled with the gasket 260 and the fitting 280. Various features of at least one of the sprinkler 104, gasket 260, and fitting 280 can be sized to facilitate rapid installation of the sprinkler 104 with proper sealing and alignment, such as to ensure that half or full turns (e.g., rotation within a threshold angle of three hundred sixty degrees, the threshold angle can be ten degrees) of the sprinkler 104 when threaded into the fitting 280 properly compress the gasket 260 and align the frame arms 224 (and, in turn, the deflector 232) at a target orientation.

For example, at least one of a height 254 of the second flange 252 (see FIG. 2B) and a pitch of the fitting engagement member 288 of the fitting can correspond to a height 1404 of the gasket 260. The height 1404 can be greater than 0.1 inches and less than 1 inch. The height 1404 can be greater than 0.15 inches and less than 0.5 inches. The height 1404 can be greater than 0.2 inches and less than 0.4 inches. The height 1404 can be 0.237 inches.

The height 1404 of the gasket 260 can define at least one of a minimum threshold and a maximum threshold, based on which features of at least one of the sprinkler 104 and the fitting 280 can be sized. The minimum threshold can correspond to a minimum engagement with the gasket 260 to enable sealing using the gasket 260 (e.g., to enable water tight sealing). The minimum threshold can be greater than ten percent and less than twenty percent of the height 1404. The minimum threshold can be greater than twelve percent and less than eighteen percent of the height 1404. The minimum threshold can be fifteen percent. For example, if the height 1404 is 0.237 inches, then the minimum threshold can be fifteen percent of 0.237 inches, which is about 0.035 inches.

The thread pitch of the fitting engagement member 288 can correspond to the minimum threshold. For example, the thread pitch of the fitting engagement member 288 can be a lowest number of threads per inch such that a half turn (e.g., rotation within a threshold angle of one hundred eighty degrees around longitudinal axis 202, the threshold angle can be less than ten degrees) relative to the fitting engagement member 288 is greater than or equal to the minimum threshold.

For example, if the minimum threshold is 0.035 inches, the fitting engagement member 288 can have a pitch of fourteen threads per inch, which is about 0.07 inches per thread, such that a half turn of the sprinkler 104 will result in the fitting engagement member 288 engaging with 0.035 inches of the gasket 260, satisfying the minimum threshold. As another example, if the height 1404 is 0.5 inches, fifteen percent of 0.5 inches is 0.075 inches, such that a pitch of the fitting engagement member 288 can be 6 threads per inch (0.16 inches per thread so that a half turn engages with 0.08 inches of the gasket 260).

The maximum threshold can correspond to a maximum engagement of the sprinkler 104 with the gasket 260 or the fitting 280, such as to ensure an appropriate amount of compression of the gasket 260 to seal the sprinkler 104 with the fitting 280 without overtightening or the components bottoming out with respect to one another (e.g., support surface 242 of the at least one flange 236 contacting outer edge 296 of the fitting 280). The maximum threshold is greater than the minimum threshold. The maximum threshold can be greater than or equal to twenty percent and less than or equal to sixty percent of the height 1404. The maximum threshold can be greater than or equal to thirty percent and less than or equal to fifty percent of the height 1404. The maximum threshold can be forty percent of the height 1404. For example, if the height is 0.237 inches, then the maximum threshold can be forty percent of 0.237 inches, which is about 0.095 inches.

The height 254 of the second flange 252 can correspond to the maximum threshold. For example, the height 254 can be less than or equal to the maximum threshold. For example, if the maximum threshold is 0.095 inches, then the height 254 can be less than or equal to 0.095 inches. As another example, if the height 1404 is 0.5 inches, forty percent of 0.5 inches is 0.2 inches, such that the height 254 can be less than or equal to 0.2 inches.

Because the gasket 260 is shielded from fluid flow by the gasket receiver 256 and the engagement member 240, the gasket 260 can be relatively soft. For example, the gasket 260 can be made from ethylene propylene diene monomer (EPDM) rubber. The gasket 260 can have a hardness greater than or equal to 50 durometers (e.g., Shore durometer) and less than or equal to 60 durometers. As such, the hardness of the gasket 260 can be low enough to facilitate hand-tightening of the sprinkler 104 with the fitting 280 (e.g., compared to harder materials, such as having hardnesses of 70-90 durometers, which may be used for gaskets to be installed relative to the sprinkler and fitting so that compression of the gasket can cause the gasket to extend radially inward into the fluid flow, restricting the fluid flow), such as by reducing the force required to tighten the sprinkler 104, and high enough to transmit a sensation of contact between the gasket 260 and the fitting 280 to a user installing the sprinkler 104 (e.g., as compared to further softer materials that may make it difficult to detect contact between the gasket 260 and the fitting 280 while tightening).

The gasket 260 can be made of various shapes, such as cross-sectional shapes. For example, the gasket 260 can have circular or rectangular cross-sections.

The inner wall edge 286 can be flat, such as depicted in FIG. 2B. The inner wall edge 286 can define an extension 1408 that extends from the inner wall 284 adjacent to a void 1412 between the inner wall 284 and the end wall 292. The extension 1408 can apply force against the gasket 260 using less surface area, which can help prevent a leak path forming around the gasket 260 when sealing the sprinkler 104 and the fitting 280. The extension 308 can extend parallel to the longitudinal axis 202 (see FIG. 2B) and from a radially inward portion of the inner wall 284 relative to the void 1412.

The support surface 238 of the sprinkler 104 can define an extension 1420 that extends from the at least one flange 236 to apply force against the gasket 260 using less surface area. The extension 1420 can extend from the at least one flange 236 in a direction towards the engagement member 240 (e.g., parallel to the longitudinal axis 202).

Figure 15:
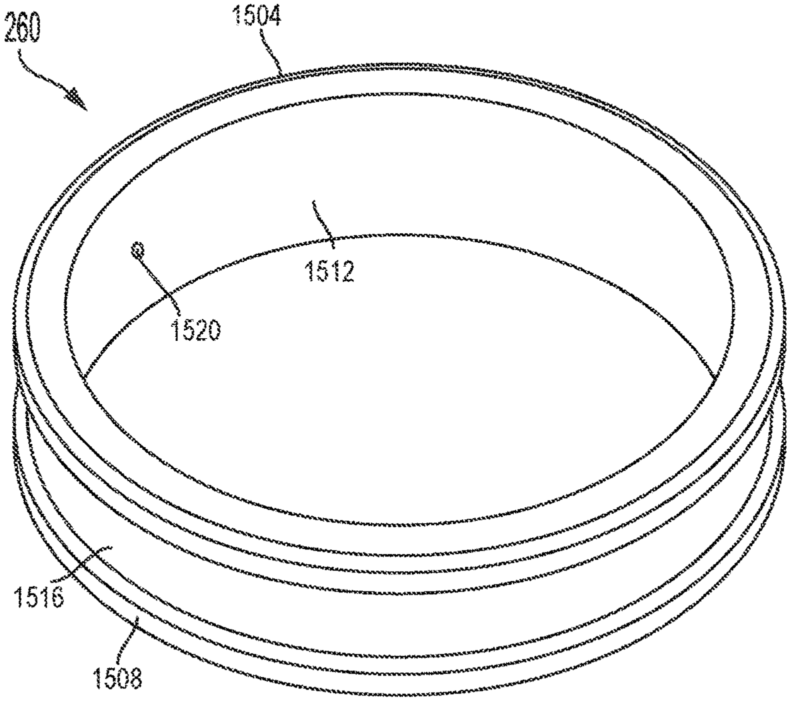
FIG. 15 depicts an example of a gasket of a sprinkler system.

FIG. 15 depicts an example of the gasket 260. The gasket 260 can include a wall 1504 having an outer surface 1508 and an inner surface 1512. The outer surface 1508 can define an insert portion 1516 around a center of the wall 1504 (e.g., a central region relative to the longitudinal axis 202 when the gasket 260 is received between the sprinkler 104 and fitting 280). The insert portion 1516 can have a lesser thickness than a remainder of the wall 1504 (see, e.g., thickness 1416 defined by the insert portion 1516 as depicted in FIG. 14). Responsive to compression, the wall 1504 and outer surface 1508 can bow outward to contact a fitting receiving the gasket 260 (e.g., to operate as a face seal). By providing the insert portion 1516 with a lesser thickness, the gasket 260 can have a relief cut that can decrease insertion forces for coupling the sprinkler 104 with the fitting 280, which can facilitate toolless installation of the sprinkler 104. The gasket 260 can include a plurality of insert portions 1516 (e.g., defined by more than two relief cuts from outer surface 1508) to facilitate sealing and engagement with decreased insertion forces.

Figure 16:
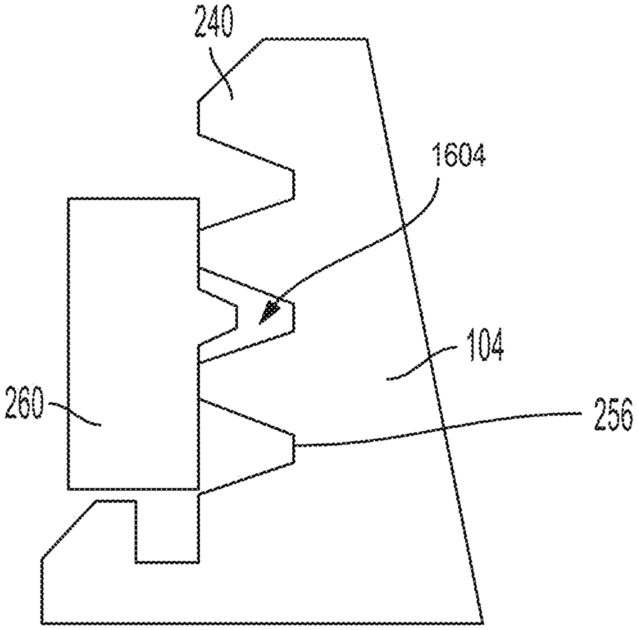
FIG. 16 depicts an example of a gasket and a sprinkler.

As depicted in FIG. 15 and FIGS. 16-18, the gasket 260 can include at least one extension 1520 that extends radially inward from the inner surface 1512. The extensions 1520 can be bumps or dimples formed on the inner surface 1512. The extensions 1520 can enable an interference fit between the gasket 260 and the sprinkler 104, which can help prevent the gasket 260 from falling off the sprinkler 104 prior to installation in fitting 280 even as the orientation of the sprinkler 104 is modified (e.g., if the sprinkler 104 is turned upside down). The extensions 1520 can be positioned symmetrically around the inner surface 1512 (e.g., within a threshold angle of being equally angularly spaced one another; the threshold angle can be less than ten degrees, less than five degrees, less than one degree). The extensions 1520 can be positioned asymmetrically. As depicted in FIG. 16, the threads of the engagement member 240 may form part of the gasket receiver 256 (e.g., the engagement member 240 can be on the surface of the gasket receiver 256), and the extensions 1520 can be received between the threads of the engagement member 240 (e.g., in voids 1604) to enable the interference fit.

Figure 17:
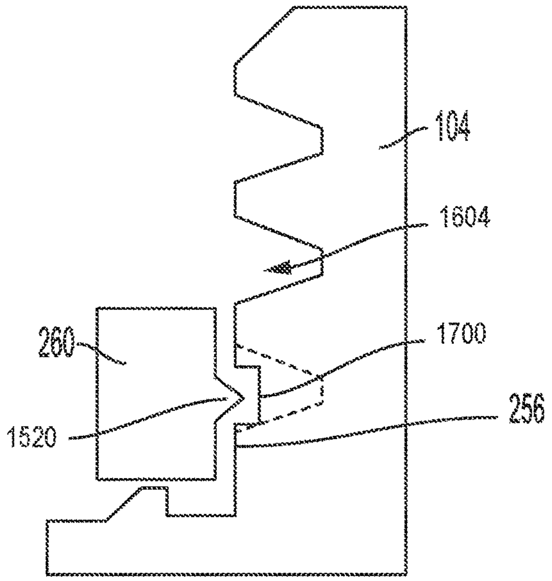
FIG. 17 depicts an example of a gasket and a sprinkler.

FIG. 17 depicts an example of the sprinkler 104 including a groove 1700 formed on the gasket receiver 256 between the engagement member 240 and the extension 320 of the sprinkler 104. The groove 1700 can receive the extensions 1520 of the gasket 260 to enable the interference fit between the sprinkler 104 and the gasket 260. As depicted in FIG. 17, the groove can have a depth less than a depth of the voids 1604 formed between the threads of the engagement member 240.

Figure 18:
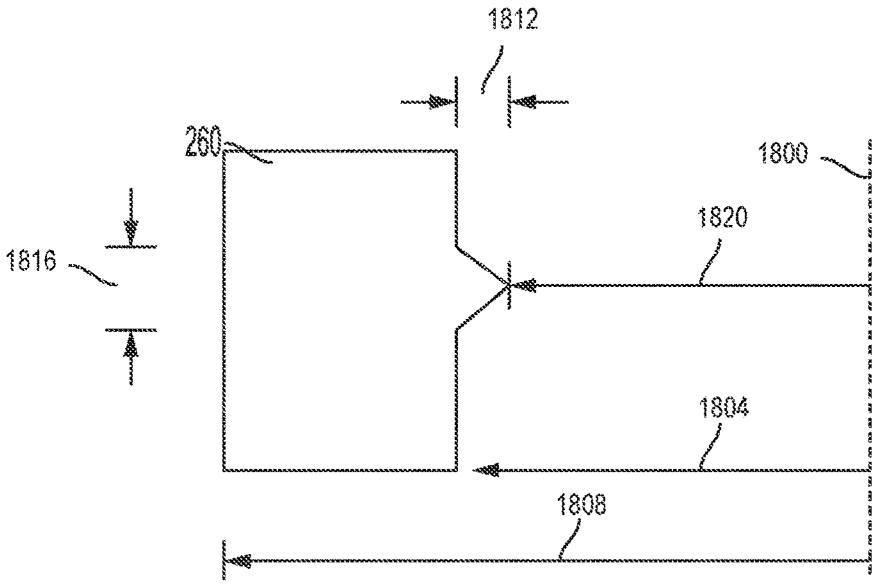
FIG. 18 depicts an example of a gasket.

FIG. 18 depicts dimensions of the gasket 260, which can enable the gasket 260 to effectively seal the sprinkler 104 with the fitting 280. The gasket 260 can define an inner radius 1804 and an outer radius 1808 relative to a gasket axis 1800 (the gasket axis 1800 can align with the longitudinal axis 202 when the gasket 260 is coupled with the sprinkler 104).

The inner radius 1804 can be greater than or equal to 0.75 inches and less than or equal to 2.5 inches. The inner radius 1804 can be greater than or equal to 1 inch and less than or equal to 2 inches. The inner radius 1804 can be greater than or equal to 1.2 inches and less than or equal to 1.5 inches. The inner radius 1804 can be 1.38 inches.

The outer radius 1808 can be greater than or equal to 1 inch and less than or equal to 3 inches. The outer radius 1808 can be greater than or equal to 1.2 inches and less than or equal to 2.2 inches. The outer radius 1808 can be greater than or equal to 1.4 inches and less than or equal to 1.6 inches. The outer radius 1808 can be 1.5 inches. A ratio of the inner radius 1804 to the outer radius 1808 can be greater than 1:1.05 and less than 1:1.5. The ratio can be 1:1.09.

The extension 1520 of the gasket 260 can define a length 1812 and a height 1816, such as to enable the interference fit between the gasket 260 and the sprinkler 104. The length 1812 can be greater than 0.01 inches and less than 0.1 inches. The length 1812 can be greater than 0.02 inches and less than 0.05 inches. The length 1812 can be 0.04 inches.

The height 1816 can be greater than 0.02 inches and less than 0.12 inches. The height 1816 can be greater than 0.03 inches and less than 0.09 inches. The height 1816 can be greater than 0.04 inches and less than 0.08 inches. The height 1816 can be 0.06 inches. A ratio of the length 1812 to the height 1816 can be greater than 1:1.1 and less than 1:2. The ratio can be 1:1.3.

The extension 1520 can define an inner radius 1820. The inner radius 1820 can enable the extension 1520 to be received by the engagement member 240 of the sprinkler 104. The inner radius 1820 can be greater than 1 inch and less than two inches. The inner radius 1820 can be greater than 1.2 inches and less than 1.5 inches. The inner radius 720 can be greater than 1.3 inches and less than 1.4 inches. The inner radius 720 can be 1.34 inches.

Figure 19:
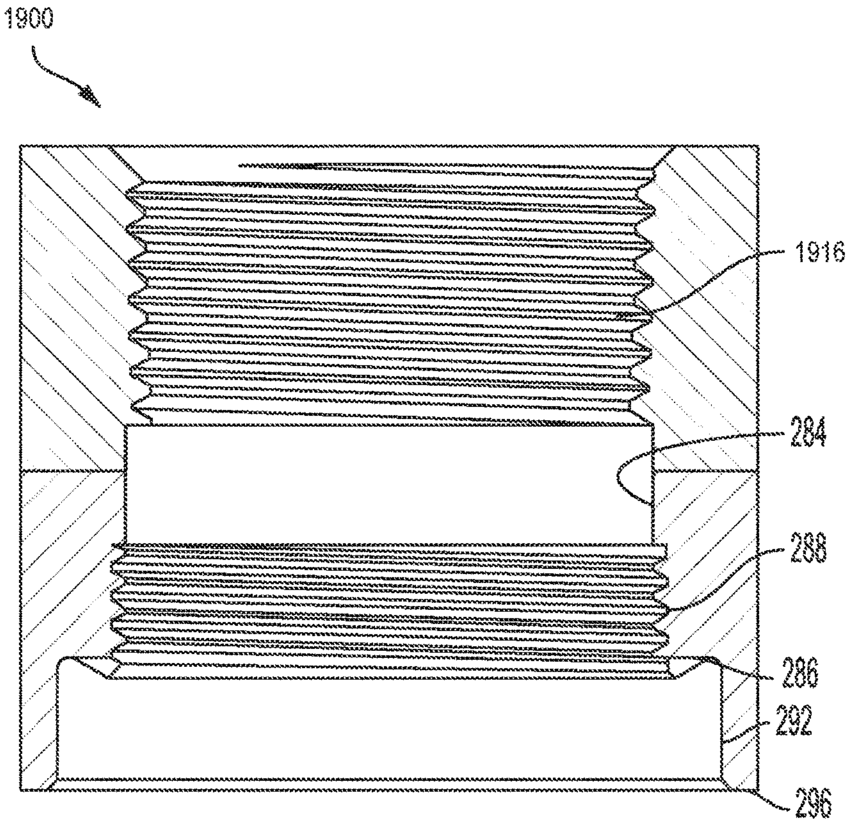
FIG. 19 depicts a cross-section view of an example of a fitting that can receive a gasket and a remote fitting.

FIG. 19 depicts an example of a fitting 1900. The fitting 1900 can incorporate features of and be used to implement the fitting 280 described with reference to FIGS. 2A and 2B. Various fittings and adapters described herein (e.g., with reference to FIGS. 19-26) can be used to convert threads from NPT to rapid install for different fittings and geometries, facilitating quick connections and/or retrofitting. For example, the fitting 1900 can be used as a female-female converter.

The fitting 1900 can include the inner wall 284 having the fitting engagement member 288. The fitting engagement member 288 can engage an engagement member of a remote fitting (e.g., the at least one engagement member 240 of the sprinkler 104). The fitting engagement member 288 can have a straight thread to facilitate toolless coupling of the remote fitting with the fitting 1900. The fitting engagement member 288 can have female threads having pitch compatible to be engaged with external (male) threads provided on a rapid install sprinkler (RIS) or rapid install early suppression, fast response (RI ESFR) sprinklers.

The fitting 1900 can include the end wall 292. The end wall 292 can have a greater inner diameter than the fitting engagement member 288. The end wall 292 can receive the remote fitting, as well as a gasket (e.g., gasket 260 described with reference to FIGS. 2A, 2B, and 14-18) positioned on an outer wall of the remote fitting to seal the fitting 1900 and the remote fitting. For example, the gasket can be received between the end wall 292 and the remote fitting and outside of contact between the fitting engagement member 288 and an engagement member of the remote fitting, enabling the gasket to seal the connection between the fittings without being exposed to fluid flow between the fittings.

The fitting 1900 can include a second engagement member 1916. The second engagement member 1916 can enable threaded engagement between the fitting 1900 and components having male threads. The second engagement member 1916 can include at least one of an interference thread or national pipe thread (NPT). The threads of the second engagement member 1916 can be female threads. The second engagement member 1916 can be spaced from the fitting engagement member 288 along the inner wall 284.

Figure 20:
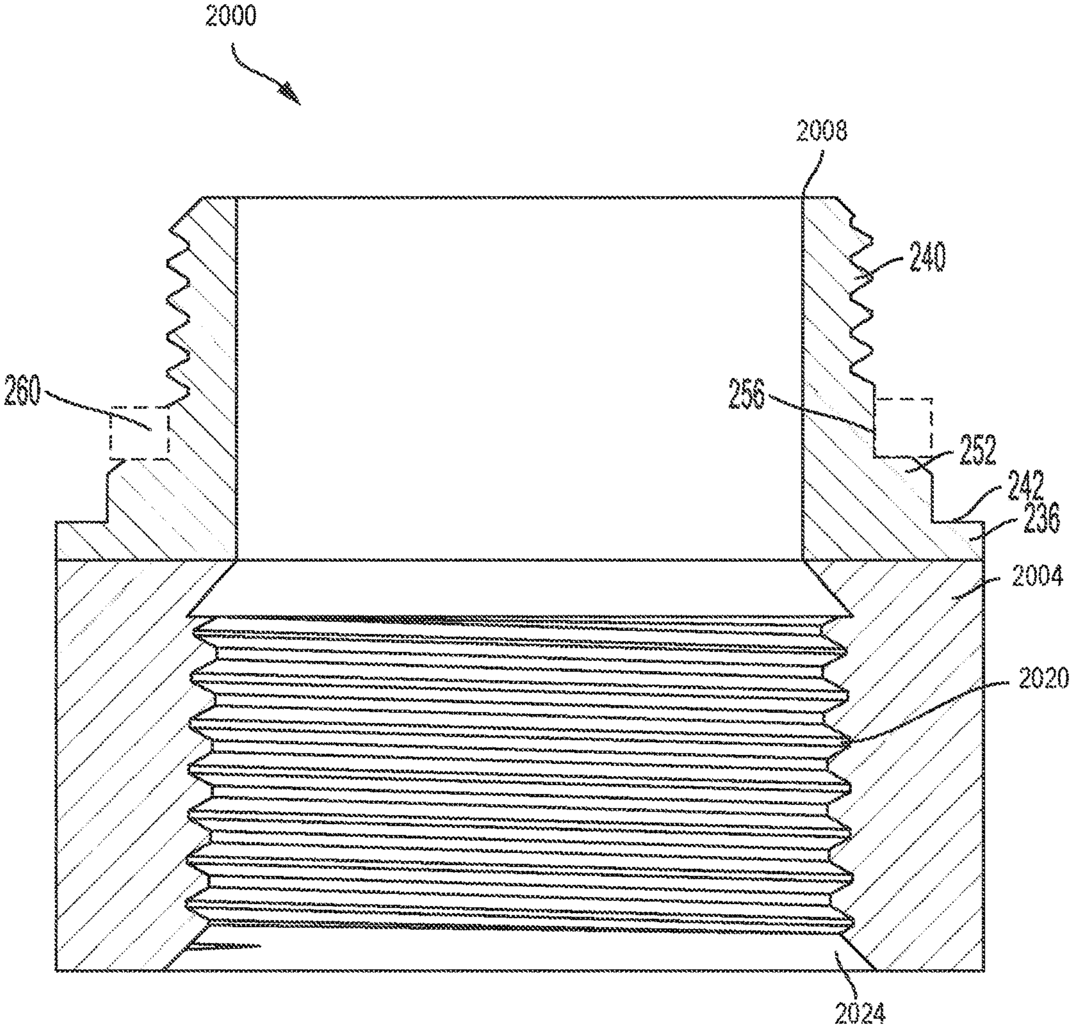
FIG. 20 depicts a cross-section view of an example of a fitting.

FIG. 20 depicts an example of a fitting 2000. The fitting 2000 can incorporate features of the sprinkler 104; for example, the sprinkler 104 can be an example of the fitting 2000. The fitting 2000 can be implemented as various types of fittings, including but not limited to sprinklers, tee joints, cross joints, elbow joints, pipe outlets, pipe couplings, or 1" threaded pipe. The fittings 1900, 2000 can be provided as a piping assembly. The fitting 1900 can be used in conjunction with the fitting 2000. The fitting 2000 can include a male RIS engagement member (engagement member 240) and a female NPT engagement member (e.g., engagement member 2020); the fitting 200 may also be formed to have a female RIS engagement member and male NPT engagement member.

The fitting 2000 includes a body 2004. At least one flange 236 extends from the body 2004. The body 2004 can include or be coupled with various components, such as sprinklers, pipe joints, or pipe couplings. For example, as depicted in FIG. 20, the body 2004 can have at least one outer engagement member 240 to connect a first remote fitting (e.g., fittings 280, 1900 or a piping adapter having inner threads compatible with RIS sprinklers' external threads) with the inlet end 2008 and an inner engagement member 2020 extending to an outlet end 2024 to connect a second remote fitting with the outlet end 2024. The inner engagement member 2020 can include at least one of an interference thread or national pipe thread (NPT). The threads of the inner engagement member 2020 can be female threads. The second remote fitting can be a standard ESFR sprinkler having engageable NPT threads or a piping having NPT threads.

The outer engagement member 240 extends between the at least one flange 236 and the inlet end 2008. The inlet end 2008 can be inserted into a remote fitting (e.g., fittings 280, 1900) and connected with the remote fitting, such as by threaded engagement between the outer engagement member 240 and a corresponding engagement member of the remote fitting. The engagement 240 can have a straight thread, such as to facilitate toolless coupling of the remote fitting with the fitting 2000. The threads of the outer engagement member 240 are male threads.

The at least one flange 236 can incorporate features of the at least one flange 236 of the sprinkler 104. The fitting 2000 includes a first flange 236 and a second flange 252. The at least one flange 236 can receive a gasket (e.g., gasket 260 described with reference to FIGS. 2A, 2B, and 14) on the at least one flange 236, such as adjacent to gasket receiver 256 (which can position the gasket away from the engagement member 240, such as radially outward from the engagement member 240). The first flange 236 can be sized to abut a remote fitting into which the inlet end 2008 is inserted, such as by extending further radially outward than the engagement member 2016, to prevent overtightening and over compression of the gasket 260 between the fitting 2000 and the remote fitting.

Figure 21:
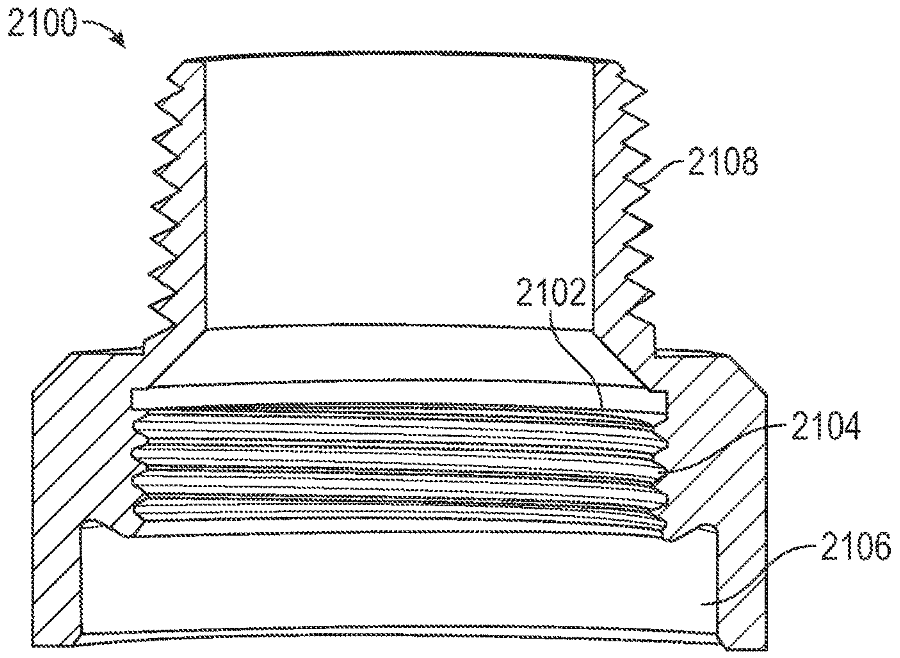
FIG. 21 depicts a cross-section view of an example of a fitting.

FIG. 21 depicts an example of a fitting 2100. The fitting 2100 can be inserted to another fitting having NPT threads. The fitting 2100 can receive another fitting or rapid install sprinkler (RIS) having straight threads, allowing for conversion from NPT to RIS.

The fitting 2100 can include an inner wall 2102 having a first fitting engagement member 2104. The first fitting engagement member 2104 can engage an engagement member of a remote fitting (e.g., the at least one engagement member 240 of the sprinkler 104 or of the fitting 2000 described with reference to FIG. 20). The first fitting engagement member 2104 can have a straight thread to facilitate toolless coupling of the remote fitting with the fitting 2000. The first fitting engagement member 2104 can have threads having pitch compatible to be engaged with external threads provided on a rapid install sprinkler (RIS) or rapid install early suppression, fast response (RI ESFR) sprinklers.

The fitting 2100 can include the end wall 2106. The end wall 2106 can have a greater inner diameter than the first fitting engagement member 2104. The end wall 2106 can receive the remote fitting, as well as a gasket (e.g., gasket 260 described with reference to FIGS. 2A, 2B, and 14-18) positioned on an outer wall of the remote fitting to seal the fitting 2100 and the remote fitting. For example, the gasket can be received between the end wall 2106 and the remote fitting and outside of contact between the first fitting engagement member 2104 and an engagement member of the remote fitting, enabling the gasket to seal the connection between the fittings without being exposed to fluid flow between the fittings.

The fitting 2100 can include a second engagement member 2108. The second engagement member 2108 can enable threaded engagement between the fitting 2100 and components (e.g., another fitting, a piping assembly, etc.) having female engageable threads. The second engagement member 2108 can include at least one of an interference thread or national pipe thread (NPT). The threads of the second engagement member 2108 are male threads. The second engagement member 2108 can be spaced from the fitting engagement member 2104 along the inner wall 2102.

The fittings 1900, 2000, 2100 can have a circular outer surface instead of a hexagonal surface provided in some fittings. The circular outer surface facilitates easy fitment of the fittings 1900, 2000, 2100 using standard wrenches. In case of hexagonal outer surface, the distance between flat surfaces of the hexagonal fitting is more than opening of an adjustable wrench used for particular diameter fitting. Thus, to operate the fittings having hexagonal surfaces, larger wrenches can be utilized. The circular outer surface of the fittings 1900, 2000, 2100 facilitates utilization of standard wrenches designated for particular fittings.

Figure 22:
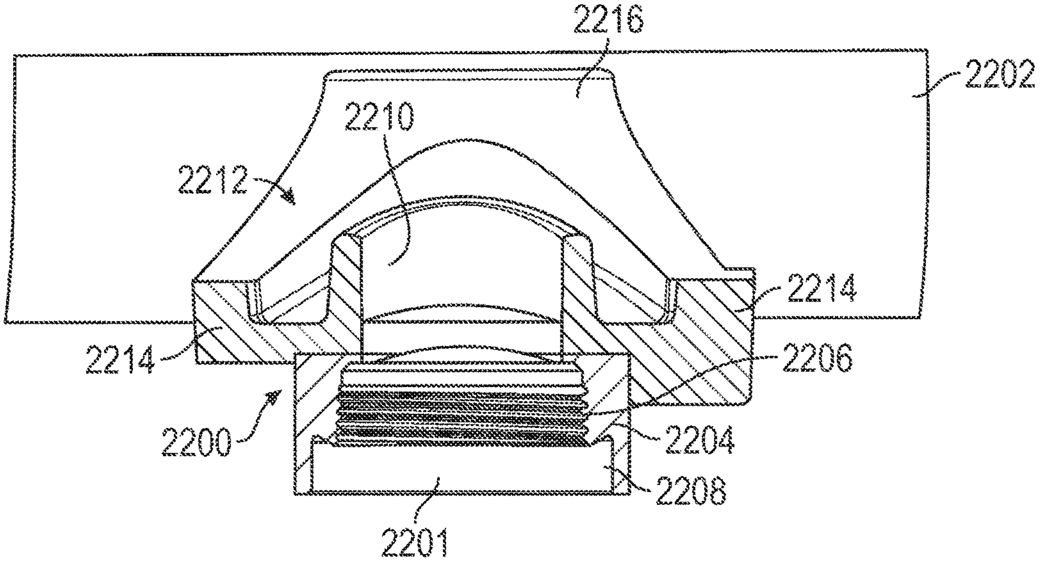
FIG. 22 depicts a cross-section view of an example of a fitting that can be connected between a piping assembly and another fitting or a rapid install sprinkler (RIS).

FIG. 22 depicts an example of a fitting 2200. The fitting 2200 can be coupled to a pipe 2202 and a rapid install sprinkler (RIS) or a remote fitting. The fitting 2200 can have a channel 2201 having a first inner wall 2204 having a first fitting engagement member 2206. The first fitting engagement member 2206 can engage to an engagement member of a remote fitting (e.g., the at least one engagement member 240 of the sprinkler 104 or of the fitting 2000 described with reference to FIG. 20). The first fitting engagement member 2206 can have a straight thread. The first fitting engagement member 2206 can have threads having pitch compatible to be engaged with external threads provided on a rapid install sprinkler (RIS) or rapid install early suppression, fast response (RI ESFR) sprinklers.

The channel 2201 can include the end wall 2208. The end wall 2208 can have a greater inner diameter than the first fitting engagement member 2206. The end wall 2208 can receive the remote fitting, as well as a gasket (e.g., gasket 260 described with reference to FIGS. 2A, 2B, and 14-18) positioned on an outer wall of the remote fitting to seal the fitting 2200 and the remote fitting. For example, the gasket can be received between the end wall 2208 and the remote fitting and outside of contact between the first fitting engagement member 2206 and an engagement member of the remote fitting, enabling the gasket to seal the connection between the fittings without being exposed to fluid flow between the fittings.

The channel 2201 includes a second inner wall 2210 extending from the first inner wall 2204 in a direction opposite to the end wall 2208. When the fitting 2200 is coupled to the pipe 2202, an open end of the second inner wall 2210 is aligned with an outlet provided on the pipe 2202 to receive fluid from the pipe 2202. The open end of the second inner wall 2210 has a shape complementary to an outer portion of the pipe 2202 having the outlet. A gasket can be provided on the open end of the second inner wall 2210 to prevent leakage of the fluid at the interface between the fitting 2200 and the pipe 2202.

The fitting 2200 includes a pair of straps provided to secure the fitting 2200 to the pipe 2202. A first strap 2212 is coupled to the channel 2201. The first strap 2212 can include a pair of ribs 2214 connected to an outer surface of the channel 2201. The ribs 2214 can be integral with the channel 2201. The ribs 2214 can be detachably connected with the channel 2201. The ribs 2214 extend in longitudinal direction of the pipe 2202. The first strap 2212 includes one or more arms provided to abut a portion of the pipe 2202. The first strap 2212 can have a pair of arms 2216 extending from opposite sides of the ribs 2214 in radial direction of the pipe 2202. The arms 2216 can be detachably or fixedly connected with the ribs 2214. The arms 2216 can be integral with the ribs 2214. The first strap 2212 can include a single arm extending in radial direction of the pipe 2202 and passing through slots on the ribs 2214. The strap 2212 can include a pocket to provide a passage to the channel 2201 to facilitate alignment of the open end of the second inner wall 2210 of the channel 2201 and the outlet on the pipe 2202. The first strap 2212 is coupled to the pipe 2202 to secure the fitting 2200 to the pipe 2202. The first strap 2212 can have an inner surface having a shape complementary to an outer surface of the pipe 2202 so that the inner surface of the strap 2212 can abut the outer surface of the pipe 2202. The arms 2216 of the first strap 2212 can be flexible so that the shape of the arms 2216 can be altered to abut the outer surface of the pipe 2202. To connect the fitting 2200 to the pipe 2202, the open end of the second inner wall 2210 is aligned with the outlet on the pipe 2202. The first strap 2212 is circumscribed about an outer portion of the pipe 2202 in the radial direction of the pipe 2202. A second strap (not shown in figures) is connected to open ends of the first strap 2212 after circumscribing the remaining outer portion of the pipe 2202 along the radial direction of the pipe 2202. The ends of the first strap 2212 and the second strap can be secured to each other using fasteners such as nut and bolt assembly, screws, or rivets.

Figure 23:
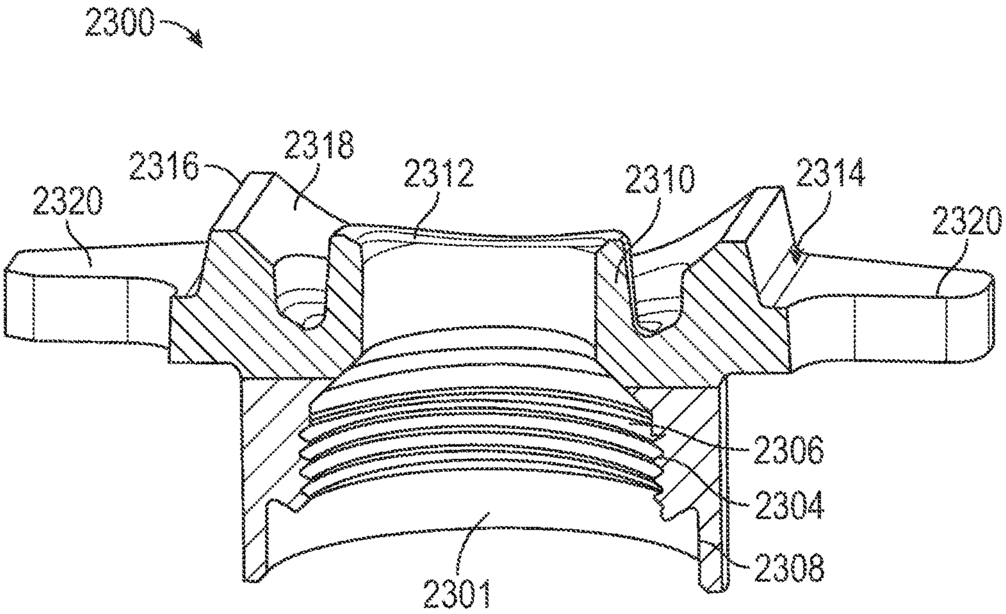
FIG. 23 depicts a cross-section view of an example of a fitting that can be connected to a piping assembly and another fitting or a rapid install sprinkler (RIS).

Referring to FIG. 23, a fitting 2300 is shown. The fitting 2300 can be coupled to a piping assembly and a rapid install sprinkler (RIS). The fitting 2300 can be used, for example, for a strap/U-bolt connection.

The fitting 2300 can have a channel 2301 having a first inner wall 2304 having a first fitting engagement member 2306. The first fitting engagement member 2306 can engage to an engagement member of a remote fitting (e.g., the at least one engagement member 240 of the sprinkler 104 or of the fitting 900 described with reference to FIG. 9). The first fitting engagement member 2306 can have a straight thread. The first fitting engagement member 2306 can have threads having pitch compatible to be engaged with external threads provided on a rapid install sprinkler (RIS) or rapid install early suppression, fast response (RI ESFR) sprinklers.

The channel 2301 can include the end wall 2308. The end wall 2308 can have a greater inner diameter than the first fitting engagement member 2306. The end wall 2308 can receive the remote fitting, as well as a gasket (e.g., gasket 260 described with reference to FIGS. 2A, 2B, and 14-18) positioned on an outer wall of the remote fitting to seal the fitting 2300 and the remote fitting. For example, the gasket can be received between the end wall 2308 and the remote fitting and outside of contact between the first fitting engagement member 2306 and an engagement member of the remote fitting, enabling the gasket to seal the connection between the fittings without being exposed to fluid flow between the fittings.

The channel 2301 includes a second inner wall 2310 extending from the first inner wall 2304 in a direction opposite to the end wall 2308. An open end 2312 of the second inner wall 2310 is aligned with an outlet provided on a pipe (not shown in figures) to receive fluid from the pipe when the fitting 2300 is connected with the pipe. The open end 2312 of the second inner wall 2310 is configured to receive a portion of the pipe having the outlet. A gasket may be provided on the open end 2312 of the second inner wall 2310 to prevent leakage of the fluid at the interface between the fitting 2300 and the pipe. The first fitting engagement member 2306 can smoothly transition to the second inner wall 2310.

The fitting 2300 includes a strap 2314 extending from an outer surface of the channel 2301 in radial direction of the channel 2301. The strap 2314 includes a pipe receiving portion 2316 for connecting the fitting 2300 to the pipe. An inner surface 2318 of the pipe receiving portion 2316 has a shape complementary to an outer surface of the pipe 2202 so that the inner surface 2318 of the pipe receiving portion 2316 can abut the pipe. The strap 2314 has a pair of ribs 2320 extending in opposite directions from an outer surface of the pipe receiving portion 2316. The ribs 2320 include slots (not shown in figures) for receiving fasteners. The fitting 2300 is fastened to the pipe such that the pipe receiving portion 2316 abuts an outer surface of the pipe in radial direction of the pipe and the open end 2312 of the second inner wall 2310 is aligned with the outlet on the pipe. The fitting 2300 is secured to the pipe using fasteners passed through the holes on the ribs 2320. The fastener can be a U-shaped bolt, wherein ends of the bolt are secured to the strap 2314 by passing through the slots on the ribs 2320 and curved portion of the fastener abuts a portion on the outer surface of the pipe.

Figure 24:
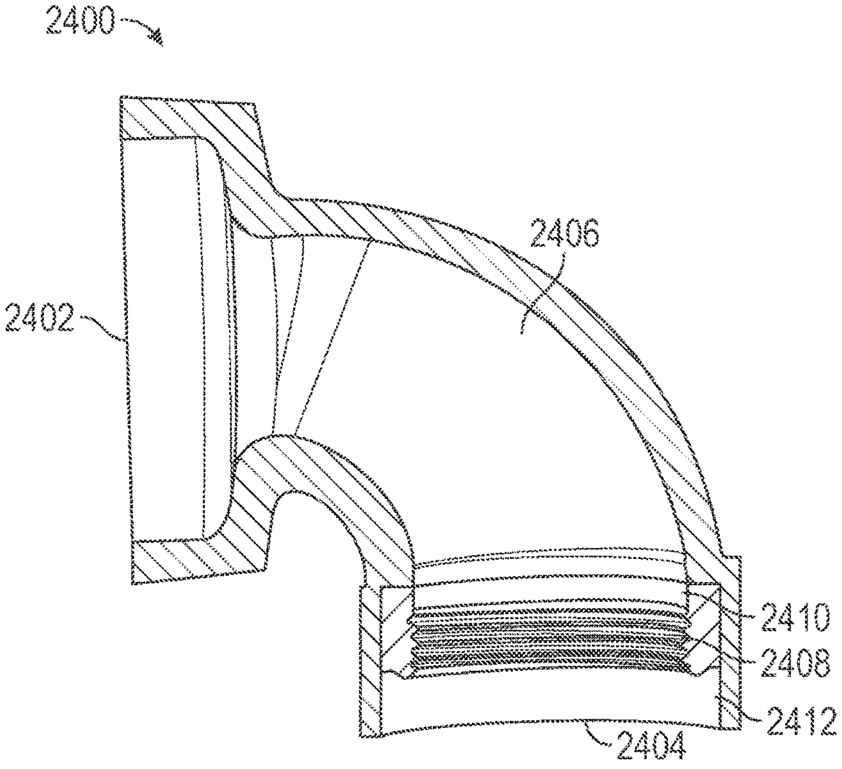
FIG. 24 depicts a cross-sectional view of an example of a fitting that can be connected to a piping assembly at an end of the piping assembly and another fitting or a rapid install sprinkler (RIS).

Referring to FIG. 24, a fitting 2400 is shown. The fitting 2400 can be coupled to a piping assembly and a rapid install sprinkler (RIS). The fitting 2400 can be employed to facilitate fluid communication between a rapid install sprinkler (RIS) and a piping assembly when the sprinkler needs to be positioned at an end section of the pipe. In some installations, when a sprinkler is required to be connected at the end of the pipe, another pipe section or a fitting is attached to the pipe proximal to the end of the pipe and the sprinkler is connected to this pipe section or the fitting. For example, the fitting 2400 can be used to at a sprinkler to an end of a branch line of a piping network. An end cap is provided at the end of the pipe to prevent fluid leakage from the end. Thus, multiple components are required to seal the end of the pipe and to connect the sprinkler near the end of the pipe. The fitting 2400 performs both the functions, e.g., the fitting 2400 acts as an end cap as well as facilitates fluid communication between the sprinkler and the end of the pipe.

The fitting 2400 can have a hollow configuration to facilitate fluid flow through the fitting 2400. The fitting 2400 has a first end 2402, a second end 2404, and a body 2406 extending between the first end 2402 and the second end 2404. The first end 2402 can be coupled to the end of a pipe or another fitting. The first end 2402 can be welded to the end of the pipe or another fitting. The first end 2402 can be provided with engageable threads having pitch complementary to the threads provided on the end of the pipe or another fitting. The first end 2402 can have a greater outer diameter than the body 2406 of the fitting 2400.

The body 2406 can have any suitable shape based on availability of space at the installation site, dimensions and type of pipe and sprinklers, etc. The body 2406 can have a curved shape such that openings at the first end 2402 and at the second end 2404 are orthogonal to each other. The fitting 2400 includes a first fitting engagement member 2408 provided at an inner wall 2410 of the body 2406 and positioned proximal to the second end 2404. The first fitting engagement member 2408 can be engaged to an engagement member of a remote fitting (e.g., the at least one engagement member 240 of the sprinkler 104 or of the fitting 900 described with reference to FIG. 9). The first fitting engagement member 2408 can have straight threads. The first fitting engagement member 2408 can have threads having pitch compatible to be engaged with external threads provided on a rapid install sprinkler (RIS) or rapid install early suppression, fast response (RI ESFR) sprinklers.

The body 2406 can include the end wall 2412 positioned between the first fitting engagement member 2408 and the second end 2404. The end wall 2412 can have a greater inner diameter than the first fitting engagement member 2408. The end wall 2412 can receive the remote fitting, as well as a gasket (e.g., gasket 260 described with reference to FIGS. 2A, 2B, and 14-18) positioned on an outer wall of the remote fitting to seal the fitting 2400 and the remote fitting. For example, the gasket can be received between the end wall 2412 and the remote fitting and outside of contact between the first fitting engagement member 2408 and an engagement member of the remote fitting, enabling the gasket to seal the connection between the fittings without being exposed to fluid flow between the fittings.

Figure 25:
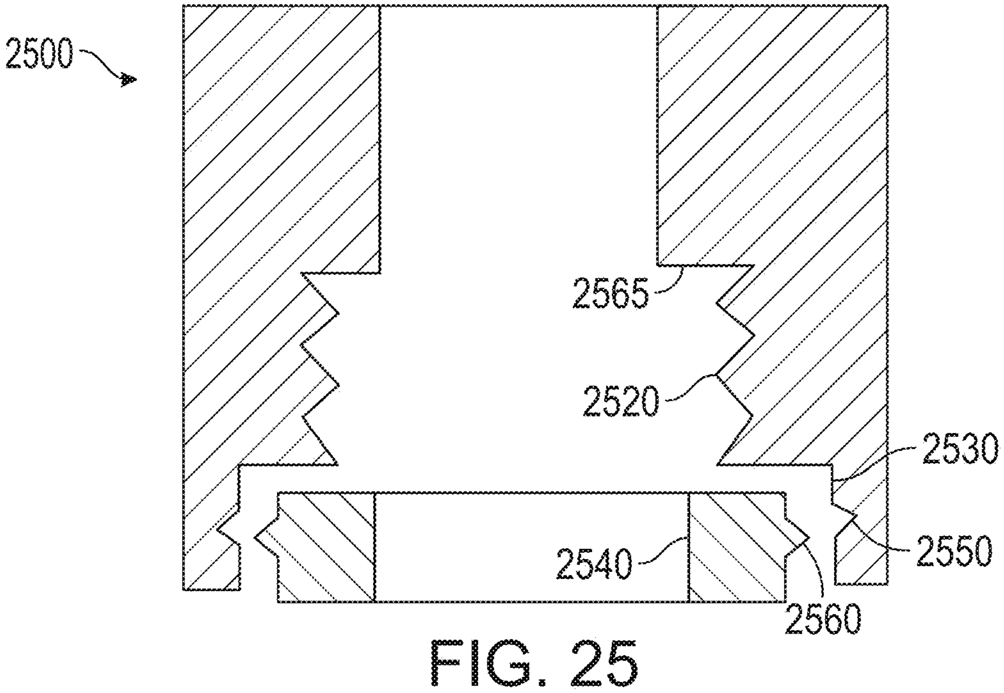
FIG. 25 depicts a cross-sectional view of an example of a fitting that can be connected to a piping assembly and another fitting or a rapid install sprinkler (RIS).

Referring to FIG. 25, a fitting 2500 is shown. The fitting 2500 includes an inner wall having at least one first fitting engagement member 2520. The first fitting engagement member 2520 can engage to an engagement member of a remote fitting (e.g., the at least one engagement member 240 of the sprinkler 104 or of the fitting 2000 described with reference to FIG. 20 or an engagement member 2630 of a sprinkler 2600 shown in FIG. 26). The first fitting engagement member 2520 can have a straight thread. The first fitting engagement member 2520 can have female threads having pitch compatible to be engaged with external threads provided on a rapid install sprinkler (RIS) or rapid install early suppression, fast response (RI ESFR) sprinklers.

The fitting 2500 can include an end wall 2530. The end wall 2530 can have a greater inner diameter than the first fitting engagement member 2520. The end wall 2530 can receive the remote fitting, as well as a gasket. For example, a gasket 2540 can be received between the end wall 2530 and the remote fitting and outside of contact between the first fitting engagement member 2520 and an engagement member of the remote fitting, enabling the gasket 2540 to seal the connection between the fittings without being exposed to fluid flow between the fittings. The gasket 2540 can be secured to the fitting 2500. The end wall 2530 can include one or more grooves 2550 and the gasket 2540 includes one or more dimples 2560 configured on an outer surface of the gasket 2540 such that the dimple 2560 is receivable in the groove 2550. Due to the arrangement of the grooves 2550 and the dimples 2560, the gasket 2540 is secured in the fitting 2500 and does not fall off, for example during transportation.

The fitting 2500 includes a thread stopper 2565 extending from the first fitting engagement member 2520 in the direction opposite to the direction of the end wall 2530. The thread stopper 2565 can be positioned radially inwards with respect to the first fitting engagement member 2520. More specifically, the inner diameter of the thread stopper 2565 can be lesser than the inner diameter of the first fitting engagement member 2520. The thread stopper 2565 can be in the form of an inner wall. The thread stopper can be in the form of protrusions extending radially inwards with respect to the first fitting engagement member 2520.

Figure 26:
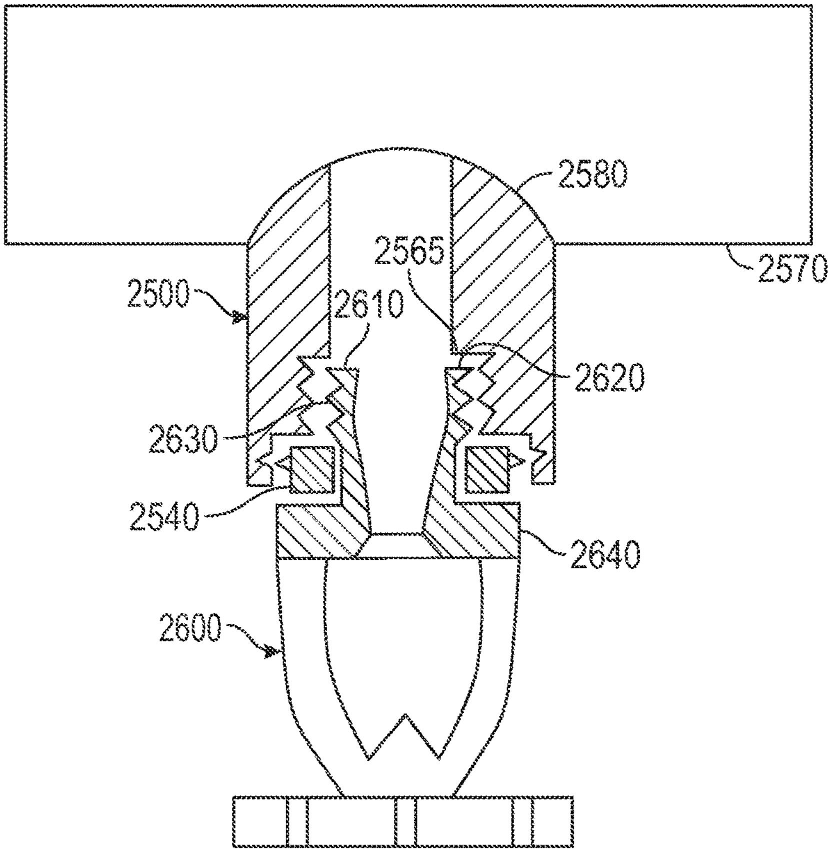
FIG. 26 depicts a sectional view of an example of a fitting and a sprinkler.

Referring to FIG. 26, the fitting 2500 can be attached to a piping assembly 2570. The fitting 2500 can be welded to the piping assembly 2570. A welded joint 2580 between the fitting 2500 and the piping assembly 2570 is shown in FIG. 26. The fitting 2500 can receive a sprinkler 2600. The sprinkler 2600 can have similar configuration as that of the sprinkler 104 except that the sprinkler 2600 may not have the flange 236. The sprinkler 2600 has an inlet end 2610 for receiving fluid from the piping assembly 2570 through the fitting 2500. The inlet end 2610 has a support surface 2620 that contacts the thread stopper 2565 when the sprinkler 2600 is received in the fitting 2500. The thread stopper 2565 limits the travel of the sprinkler 2600 in the fitting 2500, and therefore, prevents over compression of the gasket 2540. The sprinkler 2600 includes at least second fitting engagement member 2630 which are engageable with the first fitting engagement members 2520. The second fitting engagement member 2630 can have straight male threads. The sprinkler 2600 can include a flange 2640 for receiving the gasket 2540. The flange 2640 can have configuration and functionality similar to the flange 252 of the sprinkler 104. Similar to the assembly depicted in FIG. 25, the gasket 2540 includes the dimples 2560 to engage groove 2550 of the fitting 2500.

As utilized herein, the terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized.

What is claimed is:

1. A sprinkler system, comprising:

a sprinkler comprising:

a body extending between an inlet end and an outlet end along a longitudinal axis, the body defining a passageway between the inlet end and the outlet end, the body defining a thread adjacent to the inlet end; and a fitting comprising an inner wall and a sidewall extending inward from the inner wall toward the longitudinal axis; and a ring comprising a ring body, a plurality of first engagement members extending outward from the ring body away from the longitudinal axis, and a plurality of second engagement members extending inward from the ring body towards the longitudinal axis, the ring to be received between the inner wall and the sidewall and between the inner wall and the thread.

2. The sprinkler system of claim 1, comprising:

a gasket to be received between the sidewall and a flange of the sprinkler on an opposite side of the sidewall from the ring.

3. The sprinkler system of claim 1, comprising:

the plurality of second engagement members are shaped to match the thread of the sprinkler.

4. The sprinkler system of claim 1, comprising:

the sprinkler comprises a flange extending radially outward from the body further than the thread.

5. The sprinkler system of claim 1, comprising:

the plurality of first engagement members extend at an angle from the ring body; and the plurality of second engagement members extend at an angle from the ring body.

6. The sprinkler system of claim 1, comprising:

a shoulder extending from the body to stop movement of the sprinkler into the fitting.

7. The sprinkler system of claim 1, comprising:

at least one frame arm extending from the body towards an outlet end of the sprinkler;

a seal positioned in an opening defined by the body; and a thermal activation element between the seal and a deflector coupled with the at least one frame arm, the thermal activation element breaks responsive to temperature meeting or exceeding a threshold temperature to allow the seal to move out of the opening to allow fluid to flow through the opening to the deflector.

8. The sprinkler system of claim 1, comprising:

the sidewall tapers outward towards an end of the sidewall through which the sprinkler is received.

9. The sprinkler system of claim 1, comprising:

a size of at least one second engagement member of the plurality of second engagement A members corresponds to a size of a gasket coupled with the fitting.

10. The sprinkler system of claim 1, comprising:

the fitting is at least one of coupled with or integrally formed with a pipe that receives fluid to output through the sprinkler.

11. The sprinkler system of claim 1, comprising:

the sprinkler comprises a flange extending radially outward from the body further than the thread, a length of the sidewall is less than a distance from the thread to the flange.

12. A sprinkler adapter system, comprising:

a fitting comprising an inner wall around a longitudinal axis and a sidewall extending inward from the inner wall toward the longitudinal axis;

a ring comprising a ring body, a plurality of first engagement members extending outward from the ring body away from the longitudinal axis, and a plurality of second engagement members extending inward from the ring body towards the longitudinal axis, the ring body is circular and spaces the plurality of first engagement members from the plurality of second engagement members, the ring structured to be received between the inner wall and the sidewall, the ring structured to be received between the inner wall and a sprinkler; and a gasket structured to be received between the sidewall and the sprinkler.

13. The sprinkler adapter system of claim 12, comprising:

the plurality of second engagement members are shaped to match a thread of the sprinkler.

14. The sprinkler adapter system of claim 12, comprising:

the plurality of first engagement members extend at an angle from the ring body.

15. The sprinkler adapter system of claim 12, comprising:

the fitting is at least one of coupled with or integrally formed with a pipe that receives fluid to output through the sprinkler.

16. The sprinkler adapter system of claim 12, comprising:

the sidewall tapers outward towards an end of the sidewall through which the sprinkler is received.

* * * * *